(12) United States Patent
Miller et al.

(10) Patent No.: US 10,271,474 B1
(45) Date of Patent: Apr. 30, 2019

(54) APPARATUS FOR AUTOMATED FERTILIZATION AND/OR IRRIGATION, AND METHODS OF MAKING AND USING THE SAME

(71) Applicants: John C Miller, Fresno, CA (US); Deborah L. Miller, Fresno, CA (US); John Penczak, Fresno, CA (US); Jason G. Chow, Caruthers, CA (US)

(72) Inventors: John C Miller, Fresno, CA (US); Deborah L. Miller, Fresno, CA (US); John Penczak, Fresno, CA (US); Jason G. Chow, Caruthers, CA (US)

(73) Assignees: John C. Miller, Fresno, CA (US); Deborah L. Miller, Fresno, CA (US)

( * ) Notice: Subject to any disclaimer, the term of this patent is extended or adjusted under 35 U.S.C. 154(b) by 0 days.

(21) Appl. No.: 15/892,882

(22) Filed: Feb. 9, 2018

(51) Int. Cl.
| A01C 23/00 | (2006.01) |
| A01C 21/00 | (2006.01) |
| A01G 25/16 | (2006.01) |

(52) U.S. Cl.
CPC .......... *A01C 23/007* (2013.01); *A01C 21/005* (2013.01); *A01C 21/007* (2013.01); *A01G 25/165* (2013.01); *A01C 23/008* (2013.01)

(58) Field of Classification Search
CPC ....... A01C 23/00; A01C 23/04; A01C 23/042; A01C 23/006; A01C 23/007; A01C 23/008
See application file for complete search history.

(56) References Cited

U.S. PATENT DOCUMENTS

| 2,905,117 | A | * | 9/1959 | Dugan | A01C 23/024 111/123 |
| 4,337,786 | A | * | 7/1982 | Myers | A01C 23/042 137/101.21 |
| 4,917,304 | A | * | 4/1990 | Mazzei | A01C 23/042 239/304 |
| 5,135,174 | A | * | 8/1992 | Chaplinsky | A01C 23/042 239/310 |
| 5,227,068 | A | * | 7/1993 | Runyon | B01F 3/0473 210/143 |
| 6,314,979 | B1 | * | 11/2001 | Lips | A01C 23/042 137/205.5 |

(Continued)

OTHER PUBLICATIONS

Product Data Sheet; "CAN-17 Calcium Ammonium Nitrate"; 1 page; J.R. Simplot Company, Boise, Idaho.

(Continued)

*Primary Examiner* — Monica L Williams
*Assistant Examiner* — Aaron M Rodziwicz
(74) *Attorney, Agent, or Firm* — Andrew D. Fortney; Central California IP Group, P.C.

(57) ABSTRACT

An automated irrigation and/or fertigation apparatus, including a container, a plurality of pumps in the container, and a controller operably connected to each of the plurality of pumps is disclosed. Each of the pumps is configured to provide a unique fertilizer, nutrient and/or micronutrient to irrigation water. The controller is configured to control settings of each of the pumps to provide a predetermined amount of each unique fertilizer, nutrient and/or micronutrient to the irrigation water over a predetermined period of time. Corresponding methods of fertilizing a field and of making the automated irrigation and/or fertigation apparatus are also disclosed.

21 Claims, 5 Drawing Sheets

(56) References Cited

U.S. PATENT DOCUMENTS

| | | | | |
|---|---|---|---|---|
| 7,325,756 B1* | 2/2008 | Giorgis | ............... | A01G 25/09 239/304 |
| 8,434,697 B1* | 5/2013 | Olt | ............... | A01C 23/042 239/310 |
| 8,565,925 B2* | 10/2013 | Lips | ............... | A01C 23/042 222/1 |
| 8,568,506 B1* | 10/2013 | Miller | ............... | C05B 7/00 239/727 |
| 8,628,598 B1* | 1/2014 | Miller | ............... | C05B 7/00 239/727 |
| 8,690,982 B1* | 4/2014 | Miller | ............... | C05B 7/00 239/727 |
| 8,690,983 B1* | 4/2014 | Miller | ............... | C05B 7/00 239/727 |
| 8,690,984 B1* | 4/2014 | Miller | ............... | C05B 7/00 239/727 |
| 8,721,758 B1* | 5/2014 | Miller | ............... | A01C 23/042 239/727 |
| 8,721,759 B1* | 5/2014 | Miller | ............... | C05C 3/00 71/28 |
| 8,821,646 B1 | 9/2014 | Miller et al. | | |
| 8,979,969 B1* | 3/2015 | Miller | ............... | A01G 25/00 239/727 |
| 8,986,417 B1* | 3/2015 | Miller | ............... | E02B 13/00 239/727 |
| 8,986,418 B1* | 3/2015 | Miller | ............... | E02B 13/00 239/727 |
| 9,148,993 B1* | 10/2015 | Miller | ............... | A01C 23/042 |
| 9,161,489 B1 | 10/2015 | Miller et al. | | |
| 9,820,431 B2* | 11/2017 | Conrad | ............... | A01C 21/005 |

OTHER PUBLICATIONS

"DPG 0-21-0"; 1 page; Deerpoint Group, Inc., Madera, California.

"DPG Potassium Plus"; 1 page; Deerpoint Group, Inc., Madera, California.

"DPG M-TEK 2100"; 1 page; from Deerpoint Group, Inc., Madera, California.

"Potash"; Mar. 15, 2018; 8 pages; Wikipedia, https://en.wikipedia.org/wiki/Potash.

"DPG M-TEK 2200"; 1 page; from Deerpoint Group, Inc., Madera, California.

\* cited by examiner

APPARATUS FOR AUTOMATED FERTILIZATION AND/OR IRRIGATION, AND METHODS OF MAKING AND USING THE SAME

FIELD OF THE INVENTION

The present invention generally relates to the field of fertilization and/or irrigation of agricultural land. More specifically, embodiments of the present invention pertain to an automatic fertilization and/or irrigation apparatus and a method of using the same.

DISCUSSION OF THE BACKGROUND

Due to increasing labor, transportation, and raw material costs, agricultural growers require efficient and economical fertilization and/or irrigation (e.g., "fertigation") systems to continue providing abundant food to a growing population at a low cost. Although conventional fertilization and irrigation systems have improved significantly in the past few decades, recording and organizing information pertaining to the operation of agricultural sites (e.g., irrigation and fertilization schedules, targets for nutrient delivery, pH maintenance, equipment maintenance, etc.) is frequently performed manually by a technician (e.g., writing on sheets of paper). Manually recording information may lead to unforeseen inefficiencies and problems. For example, a technician may also overlook certain items of information or record information incorrectly.

In a conventional system, a user (e.g., a customer account manager) defines fertilizer targets for each crop (e.g., the amount of fertilizer and the schedule for applying the fertilizer). A field technician determines irrigation hours and timing, and goes to the site while the equipment is running. However, this requires communication (e.g., a phone call) between the technician and an irrigation manager. At the site, the field technician measures tank levels, calculates usage, calculates a target output for the next irrigation cycle, calculates pump settings based on the targets and irrigation hours, and adjusts stroke settings of the pumps to match the theoretical target settings. For adjusting pH, the adjustment of base (e.g., KOH) solution pump settings requires a recalibration of the acid solution pump as well, which can take 10-45 minutes. The field technician then fills out paperwork (e.g., 4 to 5 information sheets) by hand, including the pump settings, tank level measurements, fill information, target information and the various calculations. In some cases, the field technician takes a photo of each page of information and sends it to a data analyst. The data analyst receives, prints, and reviews the information sheet, and manually enters the data into a spreadsheet to generate a final summary report. In some cases, this cycle is repeated at least once per week (except for defining the fertilizer targets, which change less often).

FIG. 1 shows a method of fertilization and/or irrigation using a conventional, manual system. At 110, a user (e.g., a customer account manager) defines fertilizer targets for a given irrigation and/or fertilization ("fertigation") field. Each of the targets may include an amount of fertilizer (e.g., in units of pounds per acre) and schedule (e.g., a frequency, such as daily or three times per week, for a period of time, such as one month, three months, or a growing period for a particular crop).

At 120, a field technician or data analyst determines irrigation hours (e.g., 8 AM to 3 PM every other day). The field technician or data analyst calls an irrigation manager to confirm the irrigation hours.

At 130, tank levels are measured, usage is calculated, and target outputs for the next irrigation cycle are calculated. Pump settings are calculated based on the target outputs and the irrigation hours. Stroke and speed settings of each pump (i.e., for each component being applied to the field) are adjusted to match the theoretical target settings. The theoretical target settings can also be set or adjusted manually or using empirical data and/or observations.

At 140, the pH is checked, and the acid and base pumps are started at or set to their minimum settings. The speed of the acid and base pumps is slowly increased over time until the target concentrations are reached, and then the rest of the pumps (e.g., the main irrigation pumps) are turned on as long as the pH is within the target range. When the target acid and base concentrations are reached and the pH is acceptable, the method proceeds to step 160. If the target acid and base concentrations are not reached and/or and the pH is not acceptable, the method proceeds to step 150. At 150, the acid pump is recalibrated. The pH of the treated irrigation water is monitored and the speed and stroke settings of the acid and base pumps are continuously adjusted (e.g., increased) to target concentrations while maintaining a specified and/or target pH (which may be within a target pH range).

At 160, a site sheet (which generally includes several sheets of paper) is manually filled out (e.g., using paper and pen). The site sheet includes blank spaces for the pump settings, the tank level measurements, any tank fill information, the target settings or other information regarding targets, and any calculations that were performed. At 170, the site sheet is transmitted to a data analyst. In general, the technician takes photos of the site sheet and sends the photos to the data analyst by email or text message (e.g., using a smart phone). Alternatively, the technician can transmit the site sheet to the data analyst by hand.

At 180, the data analyst prints and reviews the site sheet, manually enters data from the site sheet into a spreadsheet, and generates a final summary or report. At 190, the steps 110 to 180 are typically repeated at least once per week (except for defining fertilizer targets).

There are challenges and problems with recording and processing information in conventional manual fertigation systems. First, when an error in pH calibration is indicated, no reason may be given for the error. When neutralizing excess acid or base, the field technician slowly adjusts the stroke of the pump(s) to achieve a desired pH. However, this is time-consuming when done properly, and potentially dangerous if performed improperly (equipment and/or crop damage and personal injury may result). When monitoring the level of a chemical tank or measuring the level of liquid in the tank, the accuracy of this measurement depends on (1) using the same baseline spot or reference point to measure the tank level, and (2) the technician seeing the correct level in the tank (the approximate accuracy is ±1 inch, but may be larger for different technicians). The pump output is manually adjusted by a technician in the field approximately once per week by adjusting the stroke length of the pump after calculating a theoretical pump performance. However, over- and under-feeds (typically greater than 20%) based on weekly targets are common due to the variance of the actual pump performance from the theoretical performance. In turn, this causes non-linear feeds to meet final targets (e.g., for a monthly target of 30 lbs./acre, the target may be approached by feeding weekly amounts of 8, 5, 11, and 6 lbs./acre). Controlling the speed of a pump with a variable frequency drive is not possible due to overheating of the pump. Problematic and poorly performing pumps are recognized only by output monitoring after one or more site visits and manually entering and analyzing the data, thereby causing delays in identifying such pumps. Manual calculations and entry of data commonly result in errors in summary reports. Thus, there are needs to address the above challenges and problems in recording and analyzing information in conventional manual fertigation systems.

In addition, conventional fertigation systems can be monitored and/or adjusted only while a technician is at the site. Adjustments to the conventional fertigation system (i.e., changing a pump feed rate) results in a change in pH. This change in pH must be compensated by recalibrating the acid pump flow rate, which can only be done while water is running in the irrigation water supply line. If the technician visits the site when it is not running (i.e., when water is not being delivered to the crops), the technician cannot make adjustments to the site variables, and the technician's visit will be ineffective for at least part of the visit. Several hours per technician per week or more may be misused due to the site not running when the technician is present. Furthermore, an inability to adjust pump feed rates can cause improper feed rates and equipment malfunction.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to an automated fertigation apparatus, a method of fertilizing and/or irrigating a field, and a method of making an apparatus for fertilizing and/or irrigating a field. The apparatus comprises a container, a plurality of pumps in the container, and a controller operably connected to each of the plurality of pumps. Each of the plurality of pumps is configured to provide a unique fertilizer, nutrient and/or micronutrient to irrigation water. The controller is configured to control settings of each of the plurality of pumps to provide a predetermined amount of each unique fertilizer, nutrient and/or micronutrient to the irrigation water over a predetermined period of time.

In various embodiments, the container is sealed and/or locked. For example, the container may be configured to provide a substantially waterproof housing for the plurality of pumps, the controller, and any other components enclosed within the housing. The container may comprise plastic and/or a metal. When the container comprises the plastic, the plastic may be selected from the group consisting of polyethylene, polypropylene, polystyrene, polydienes, polycarbonates, polyphenols, and copolymers and blends thereof. When the container comprises the metal, the metal is selected from the group consisting of aluminum, titanium, iron, and alloys thereof (e.g., steel or stainless steel). In some embodiments, the container further comprises a powder coating on an exterior surface thereof. The powder coating may be adapted to resist, reduce or inhibit corrosion of the container and/or dissipate or eliminate a static charge on the container.

In many embodiments, the plurality of pumps comprises three pumps. For example, a first pump may be configured to provide a first fertilizer and/or nutrient (e.g., a first source of nitrogen, a first source of calcium, and/or a first source of carbon), a second pump may be configured to provide a second fertilizer and/or nutrient different from the first fertilizer and/or nutrient (e.g., a source of phosphorous), and a third pump may be configured to provide a third fertilizer and/or nutrient different from the first and second fertilizers and/or nutrients (e.g., a source of potassium). However, any number of pumps may be present, as long as the number is at least two. For example, the first pump may be configured to provide a nitrogen-containing fertilizer and/or nutrient (e.g., ammonium nitrate or calcium ammonium nitrate), and the second pump may be configured to provide a mixture or source of phosphorous- and potassium-containing fertilizer(s) and/or nutrient(s) (e.g., potassium hydrogen phosphate, potassium dihydrogen phosphate, a mixture thereof, a mixture of phosphoric acid and potash, etc.). Alternatively, where the soil contains a relatively high concentration of nitrate, the two pumps may be configured to provide separate phosphorous- and potassium-containing fertilizers and/or nutrients, or (i) a mixture or source of phosphorous- and potassium-containing fertilizer(s) and/or nutrient(s) and (ii) a mixture of micronutrients.

In further embodiments, the plurality of pumps may further comprise a fourth pump. The fourth pump may be configured to provide a second source of nitrogen, a second source of carbon and/or one or more micronutrients (e.g., a mixture of micronutrients). The micronutrients may be selected from the group consisting of zinc, iron, manganese, boron, magnesium, copper, cobalt, molybdenum and combinations thereof. In additional or alternative embodiments, one of the pumps (e.g., a fourth or fifth pump) may be configured to provide a source of acid or base. In a further embodiment, an additional pump (e.g., a fifth or sixth pump) may be configured to provide a source of the other of the acid or the base.

In some embodiments of the apparatus, the controller is further configured to: (1) store (i) targets for each of the predetermined amount of each unique fertilizer, nutrient and/or micronutrient and (ii) settings for each of the pumps corresponding to the predetermined amount of each unique fertilizer, nutrient and/or micronutrient over the predetermined period of time; (2) compare actual amounts of each unique fertilizer, nutrient and/or micronutrient delivered over the predetermined period of time with the targets for each predetermined amount of each unique fertilizer, nutrient and/or micronutrient; and/or (3) adjust the settings for each of the pumps to move the actual amounts of each unique fertilizer, nutrient and/or micronutrient towards the corresponding targets.

In various embodiments, the apparatus may further comprise a wireless transceiver operably connected to the controller. The wireless transceiver may be configured to (i) receive from a remote computer an irrigation schedule and/or an instruction to send performance information and (ii) transmit to the remote computer the performance information. The performance information may comprise a volume of each of the unique fertilizers, nutrients and/or micronutrients consumed, an irrigation time, an irrigation water volume and/or rate, and/or a speed and/or stroke of each of the plurality of pumps. The performance information may further comprise an actual rate and/or amount of each fertilizer, nutrient and/or micronutrient provided to the irrigation water over the predetermined period of time, a pressure and/or flow rate of the irrigation water (before or after the predetermined amount of each unique fertilizer, nutrient and/or micronutrient is provided thereto), a pump power, override and/or switch information for one or more of the plurality of pumps, a pH of the irrigation water after the predetermined amount of each unique fertilizer, nutrient and/or micronutrient is provided thereto, calibration information, a run time for each of the plurality of pumps, and/or a pH alarm.

Other or further embodiments of the apparatus may further comprise a serializer/deserializer configured to communicate information between the controller and the wireless transceiver. The wireless transceiver may comprise a cellular gateway router or modem. The present apparatus may also further comprise a human-machine interface operably connected to the controller, configured to enable a user to enter one or more of the targets and the settings into the controller.

In various embodiments, the apparatus may further comprise a pH sensor configured to determine a pH of the irrigation water after the predetermined amount of each unique fertilizer, nutrient and/or micronutrient is provided thereto, a recirculation pump configured to sample the irrigation water after the predetermined amount of each unique fertilizer, nutrient and/or micronutrient is provided thereto and provide the sampled irrigation water to the pH sensor, a plurality of level sensors, each configured to determine a level of a corresponding unique fertilizer, nutrient and/or micronutrient in a corresponding storage tank or vessel, and/or, for each of the pumps, one or more flow sensors configured to determine a flow rate of the corresponding pump. The controller may be configured to receive information from the pH sensor and/or each of the level sensors.

In various embodiments, the apparatus may further comprise a plurality of drivers, a plurality of fans, and/or a power supply. Each of the drivers may be configured to control an output of a corresponding pump. Each of the fans may be configured to cool one or more (e.g., a corresponding one) of the pumps. The power supply may be configured to supply electrical power to the controller and each of the pumps, as well as to any other electrical component in the apparatus.

Another aspect of the present invention relates to a method of fertilizing and/or irrigating a field, comprising delivering a predetermined amount of each of a plurality of fertilizers, nutrient and/or micronutrients to irrigation water for the field over a predetermined period of time using a plurality of pumps in a container, and controlling settings of each of the plurality of pumps using a controller in the container. Each of the plurality of pumps is configured to provide a unique fertilizer, nutrient, micronutrient or combination thereof to the irrigation water. The settings of each pump are configured to provide the predetermined amount of the corresponding unique fertilizer, nutrient, micronutrient or combination thereof to the irrigation water over the predetermined period of time.

In various embodiments of the method, a first fertilizer and/or nutrient may be delivered with a first pump, a second fertilizer and/or nutrient different from the first fertilizer and/or nutrient may be delivered with a second pump, and a third fertilizer and/or nutrient different from the first and second fertilizers and/or nutrients may be delivered with a third pump. As for the apparatus, the first fertilizer and/or nutrient may comprise a first source of nitrogen, a source of calcium, and/or a first source of carbon, the second fertilizer and/or nutrient may comprise a source of phosphorous, and the third fertilizer and/or nutrient may comprise a source of potassium.

In further embodiments, a second source of nitrogen, a second source of carbon and/or one or more micronutrients may be delivered with a fourth pump. When the fourth pump delivers the micronutrients, the micronutrients may be selected from the group consisting of zinc, iron, manganese, boron, magnesium, copper, cobalt and molybdenum. The method may further comprise delivering a source of acid or base with a fifth pump, and optionally, delivering a source of the other of the acid or the base with a sixth pump.

In various embodiments, the method may further comprise (1) storing (i) targets for each of the predetermined amounts of each unique fertilizer, nutrient and/or micronutrient and (ii) settings for each of the pumps corresponding to the predetermined amount of each unique fertilizer, nutrient and/or micronutrient over the predetermined period of time in the controller, (2) comparing actual amounts of each unique fertilizer, nutrient and/or micronutrient delivered over the predetermined period of time with the targets for each predetermined amount of fertilizer, nutrient and/or micronutrient, and/or (3) adjusting the settings for each pump to move the actual amounts of each unique fertilizer, nutrient and/or micronutrient towards the corresponding targets using the controller.

The method may further comprise wirelessly transmitting from a remote computer to the controller (i) an irrigation schedule and/or (ii) an instruction to send performance information, and optionally, transmitting the performance information (e.g., from the present apparatus) to the remote computer, and when the performance information contains no errors, transmitting the performance information from the remote computer to a customer or other downstream recipient. As for the present apparatus, the performance information may comprise a volume of each of the unique fertilizers, nutrients and/or micronutrients consumed, an irrigation time, an irrigation water volume and/or rate, and/or a speed and/or stroke of each of the plurality of pumps. In further embodiments, the performance information may further comprise an actual rate and/or amount of each fertilizer, nutrient and/or micronutrient provided to the irrigation water over the predetermined period of time, a pressure and/or flow rate of the irrigation water (before or after the predetermined amount of each unique fertilizer, nutrient and/or micronutrient is provided thereto), a pump power, override and/or switch information for one or more of the pumps, a pH of the irrigation water after the predetermined amount of each unique fertilizer, nutrient and/or micronutrient is provided thereto, calibration information, a run time for each of the plurality of pumps, and/or a pH alarm.

In some embodiments, the method may further comprise entering one or more of the targets and/or the settings into the controller using a human-machine interface operably connected to the controller, determining a flow rate of each of the pumps using one or more corresponding flow sensors, and/or determining a pH of the irrigation water using a pH sensor after the predetermined amount of each unique fertilizer, nutrient and/or micronutrient is provided thereto. When the method comprises determining the pH of the irrigation water, the method may further comprise sampling the irrigation water after the predetermined amount of each unique fertilizer, nutrient and/or micronutrient has been added, and providing the sampled irrigation water to the pH sensor with a recirculation pump.

In other or further embodiments, the method may further comprise determining a level of each unique fertilizer, nutrient and/or micronutrient in a corresponding storage tank or vessel with a corresponding level sensor, transmitting information from each level sensor to the controller, and/or controlling an output of a corresponding one of the plurality of pumps (e.g., using the information from one or more or the level sensors). The method may also further comprise cooling the pumps with one or more (e.g., a plurality of) fans. For example, the fan(s) may be mounted on or near the pumps in a 1:1 relationship. The method may also further comprise supplying electrical power to the controller, each of the pumps, and any other electrical component in the apparatus through a power supply.

Yet another aspect of the present invention relates to a method of making an apparatus for fertilizing and/or irrigating a field, comprising placing a plurality of pumps in a container, placing or mounting a controller in the container, and operably connecting the controller to each of the plurality of pumps. Each of the pumps may be configured to provide a unique fertilizer, nutrient and/or micronutrient to irrigation water. The controller may be configured to control settings of each of the plurality pumps to provide a predetermined amount of each unique fertilizer, nutrient and/or micronutrient to the irrigation water over a predetermined period of time.

As for the other aspects of the present invention, the method of making may further comprise configuring the container to be sealed and/or locked, and/or to provide a substantially waterproof housing for the pumps, the controller, and any other components enclosed within the housing. As for the present apparatus, the container may comprise plastic and/or a metal. The method may also further comprise depositing and/or coating a powder on an exterior surface of the container. The powder coating may be adapted to resist, reduce or inhibit corrosion of the container and/or dissipate or eliminate a static charge on the container.

In some embodiments of the method of making, three pumps are placed and/or installed in the container. A first pump may be configured to provide a first fertilizer and/or nutrient, a second pump may be configured to provide a second fertilizer and/or nutrient, and a third pump may be configured to provide a third fertilizer and/or nutrient. The method of making may further comprise placing and/or installing a fourth pump configured to provide one or more micronutrients in the container. The method of may further comprise placing and/or installing an additional pump configured to provide a source of acid or base, and optionally, another pump configured to provide a source of the other of the acid or the base, in the container. Further embodiments may further include installing a plurality of storage tanks configured to store a unique fertilizer, nutrient, micronutrient or combination thereof on a site at which the apparatus is to be implemented, and operably connecting each of the storage tanks to a corresponding one of the pumps.

The method of making may further comprise operably connecting a wireless transceiver to the controller, operably connecting a serializer/deserializer to the controller and the wireless transceiver, and/or operably connecting a human-machine interface to the controller. The wireless transceiver may be configured to (i) receive information and/or an instruction from a remote computer and (ii) transmit information to the remote computer. In some embodiments, the wireless transceiver may comprise a cellular gateway router or modem. The human-machine interface may be configured to enable a user to enter in the controller one or more (i) targets for each predetermined amount of each unique fertilizer, nutrient and/or micronutrient and (ii) settings for each of the pumps corresponding to the predetermined amount of each unique fertilizer, nutrient and/or micronutrient over the predetermined period of time. The human-machine interface may be configured to enable a user to enter and read information pertaining to performance characteristics and monitoring (e.g., of the pumps, the apparatus, etc.), customer/site information, calibration information and alarms (e.g., alarm settings, excursions, etc.).

The method of making may further comprise installing (1) a pH sensor configured to determine a pH of the irrigation water after the predetermined amount of each unique fertilizer, nutrient and/or micronutrient is provided thereto, (2) a recirculation pump configured to sample the irrigation water after the predetermined amount of each unique fertilizer, nutrient and/or micronutrient is provided thereto, and/or (3) for each pump, one or more flow sensors or other output measuring device configured to determine a flow rate of the corresponding pump. When the method comprises installing the recirculation pump, the recirculation pump may be installed such that the recirculation pump provides the sampled irrigation water to the pH sensor.

The method of making may further comprise installing a plurality of level sensors, operably connecting a plurality of drivers to the controller and the pumps, installing one or more (e.g., a plurality of) fans, and/or operably connecting a power supply to the controller, each of the pumps, and any other electrically-powered component in the container. Each level sensor may be configured to determine a level of a corresponding unique fertilizer, nutrient and/or micronutrient in a corresponding storage tank or vessel. Each of the drivers may be configured to control an output of a corresponding one of the pumps. Each fan may be configured to cool one or more (e.g., a corresponding one) of the pumps. For example, installing the fan(s) may comprise coupling or connecting each of the fans in a 1:1 relationship to a corresponding one of the pumps.

The present invention advantageously provides the attributes of a conventional fertilizer system, but in combination with novel programming and equipment. The present invention may be self-directing, automated, and able to precisely control the feed of chemicals (raw materials and fertilizers, including macronutrients and micronutrients) without the aid of a technician being at the remote location or site. The present invention provides an even greater enhancement in crop fertilization and production by allowing for complete automation of fertilizer addition, as well as instantaneous observation and adjustment of any and all of the potential nutrients without the need for a technician to be on-site. The system can instantaneously sense the delivery of each fertilizer and can automatically adjust the amount of fertilizer (or acid, base or micro- and/or micronutrient) to a target level as programmed for the season or cycle.

The present invention also provides other advantages as described below. If there are changes in nutrient requirements (e.g., a change in fertilizer feed rate or period) due to weather, changes in crop nutritional requirements, or any other reason, a data analyst (e.g., in a remote office) may send a new nutrient profile over the internet to the automated system. The system can automatically adjust for that nutrient, as well as for other changes in the automated system, since changing one component or variable may also change requirements for one or more other components or variables in the profile. In other words, if one feed rate is changed, other feed rates in the profile may be adjusted by the data analyst (e.g., all of the feed rates may be changed as required).

Each week, the customer or user of the present system may receive an email from the automated system that reports fertilizer, acid/base, nutrient and/or micronutrient levels to the nearest 0.1 pound per acre (or 0.01 g/m$^2$ or 10 kg/km$^2$). Alternatively, the customer or user may view the data (e.g., fertilizer, acid/base, nutrient and/or micronutrient levels) in real time. For example, the system can update the data relatively frequently (e.g., every 0.5-60 seconds, every 1-60 minutes, or any value or range of values therein, such as every 2 minutes), but for practical reasons, may be updated less frequently (e.g., hourly or daily). In addition, the technician is needed only to take delivery of fertilizer or nutrients (typically, 6500 gallons per tank, with 4 to 6 tanks being present in a typical system) and to provide occasional maintenance and equipment repairs.

These and other advantages of the present invention will become readily apparent from the detailed description of various embodiments below.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, the terms "data" and "information" are generally used interchangeably herein, but are generally given their art-recognized meanings. Also, for convenience and simplicity, the terms "location" and "site" may be used interchangeably, as may the terms "connected to," "coupled with," "coupled to," and "in communication with," but these terms are also generally given their art-recognized meanings.

The invention, in its various aspects, will be explained in greater detail below with regard to exemplary embodiments.

An Exemplary Method for Automatic Irrigation and/or Fertilization

Figure 1:
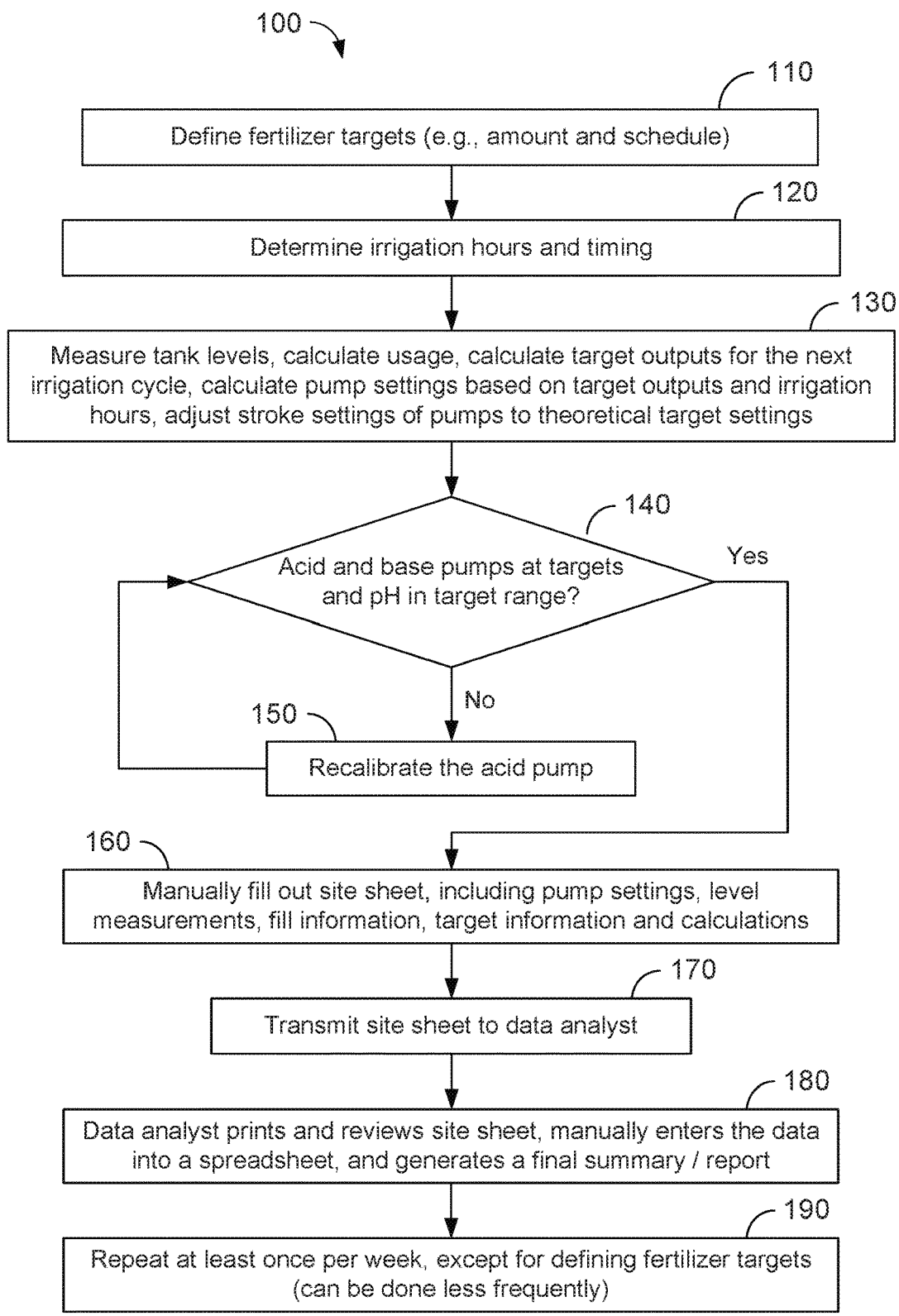
FIG. 1 is a flowchart showing a conventional method of fertigation.
Figure 2:
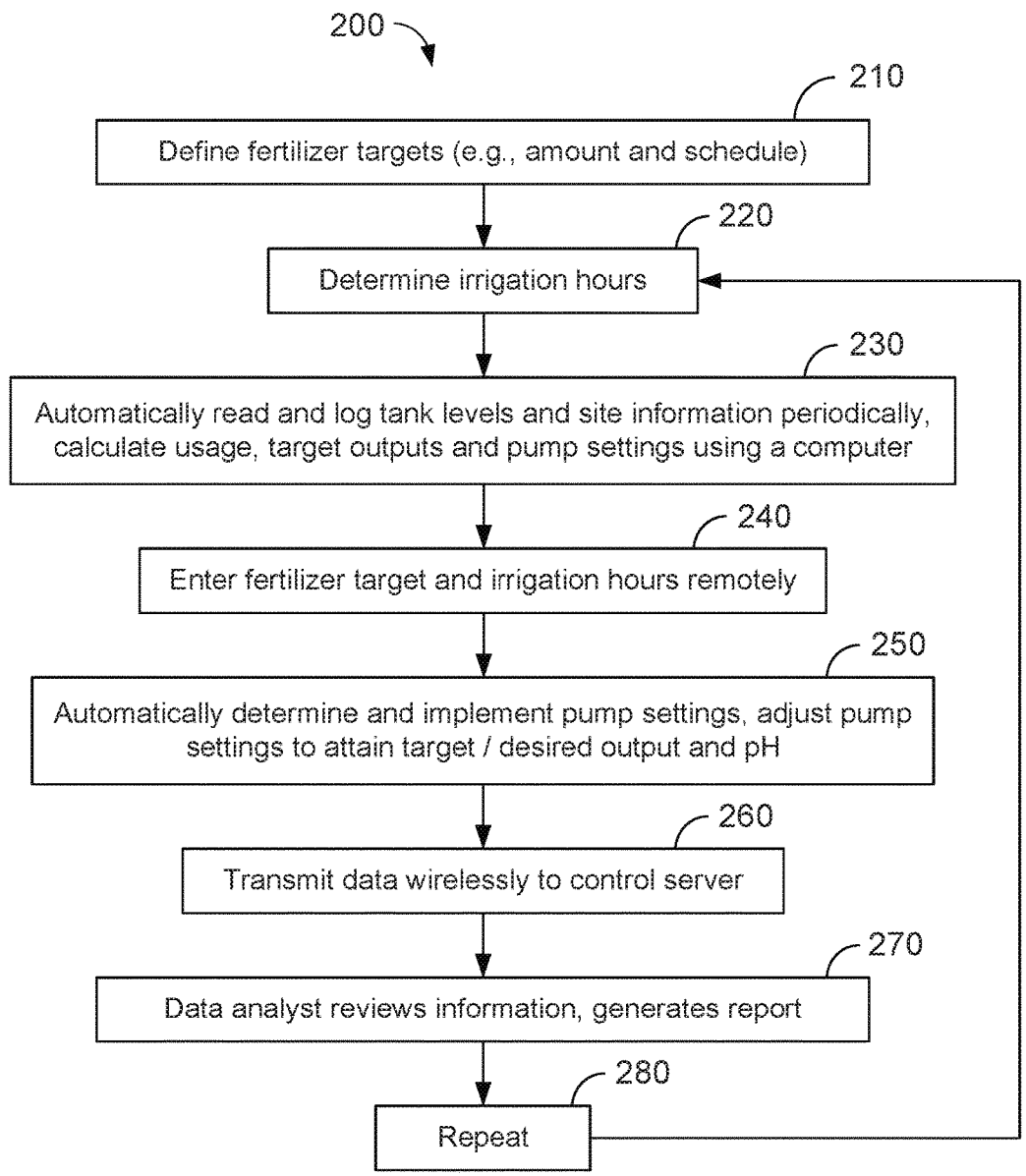
FIG. 2 is a flowchart showing an exemplary method of automatic fertilization and/or irrigation, in accordance with one or more embodiments of the present invention.

FIG. 2 is a flow chart 200 for an exemplary method for automatic irrigation and/or fertilization according to one or more embodiments of the present invention. At 210, fertilizer targets are defined (e.g., by a user such as a customer account manager or other person having an understanding of the method and/or the operation of the automated apparatus and/or system discussed with regard to FIGS. 3-4). Each of the targets may include a pH, an amount of fertilizer, nutrient and/or micronutrient (e.g., in units of pounds per acre, grams per square meter, kilograms per square kilometer, etc.), and a schedule for delivery and/or application of the fertilizer, nutrient and/or micronutrient (e.g., frequency over a period of time such as one week, one month, a growing season, etc.).

The fertilizers and nutrients may include one or more sources of nitrogen (e.g., an aqueous solution of urea, formamide, acetamide, ammonium nitrate, ammonium nitrite, ammonium carbonate, ammonium formate, ammonium acetate, lithium nitrate, lithium nitrite, sodium nitrate, sodium nitrite, potassium nitrate, potassium nitrite, etc.), phosphorous (e.g., an aqueous solution of mono-, di- or tribasic ammonium phosphate, ammonium phosphite, mono-, di- or tribasic lithium phosphate, lithium phosphite, mono-, di- or tribasic sodium phosphate, sodium phosphite, mono-, di- or tribasic potassium phosphate, potassium phosphite, etc.), potassium (e.g., an aqueous solution of potassium chloride, potassium bromide, potassium iodide, potassium hydroxide, potassium nitrate, potassium nitrite, potassium sulfate, potassium thiosulfate, potassium carbonate, potassium bicarbonate, potassium formate, potassium acetate, etc.), carbon (e.g., an aqueous solution of urea, formamide, acetamide, lithium carbonate, lithium bicarbonate, lithium formate, lithium acetate, sodium carbonate, sodium bicarbonate, sodium formate, sodium acetate, potassium carbonate, potassium bicarbonate, potassium formate, potassium acetate, etc.), calcium (e.g., an aqueous solution of calcium chloride, calcium bromide, mono-, di- or tricalcium phosphate, calcium nitrate, calcium ammonium nitrate, calcium sulfate, calcium thiosulfate, calcium formate, calcium acetate, etc.), trace minerals such as zinc, iron, boron, copper, magnesium, manganese, cobalt, molybdenum, etc. (each as a corresponding oxide and/or hydroxide [which may be solubilized or chelated with a chelating agent such as ethylene diamine tetraacetate (EDTA) or nitrilotriacetic acid (NTA)], nitrate, chloride, bromide, formate, acetate, phosphonate, etc.).

At 220, a user (e.g., a customer account manager, a field technician, a data analyst, etc.) determines the irrigation hours (e.g., 6 AM to 10 AM every day, 8 AM to 3 PM every other day, etc.). The user may call an irrigation manager for the site (e.g., the field to be irrigated) to confirm the irrigation hours. At 230, the tank levels are read or measured, and site information is recorded (e.g., in a memory associated with the on-site programmable controller). The tank levels are read or measured by one or more conventional optical meters, sonic meters, etc., configured to determine the depth of air or liquid in a tank having known, fixed dimensions (e.g., depth and volume). The site information may include customer and site name, irrigation schedule, site acreage, fertilizer targets, water usage and flow rate, irrigation system on/off times, types of fertilizers used, pump sizes and stroke settings, pump speed settings, fertilizer tank levels and alarms, pump output, pump performance and alarms, pH, pH calibration information and pH related alarms, chemical delivery and fill information, and total fertilizer usage, etc. The tank levels and site information are automatically and periodically read and recorded/retained in memory during the fertigation schedule (which is adjustable).

Usage, target outputs and pump settings are then calculated by a computer. At 240, the user enters the fertilizer targets and irrigation hours remotely into a programmable controller (e.g., in the automated apparatus and system described with regard to FIGS. 3-4). At 250, the programmable controller (e.g., a programmable logic controller [PLC]) determines and implements the pump settings when the apparatus/system is on. The programmable controller automatically compares the pump outputs (e.g., as calculated from the pump settings and/or from downstream pump output meters) and adjusts the pump settings to attain the target fertilizer/nutrient outputs and pH.

The output for each pump is determined by either determining the amount of fertilizer used in a given amount of time, or directly by measuring the flow rate with a flow meter downstream from the pump. The output is then compared to the target output. This difference as well as the pump performance history is used to calculate and implement a new pump speed. The pumps may use stepper-type motors to adjust the stroke setting of each pump. The timing for calculating and implementing the change in pump settings is adjustable. The automatic comparison and adjustment of pump settings approaches the target output without any significant deviations above or below the target.

For pH adjustments, the treated irrigation water is constantly monitored and the PLC calculates the difference between the current pH and the target pH. The speed of the acid pump is adjusted to attain the target pH. The timing for calculating and implementing the change in the acid pump is adjustable. There are also alarms that can be triggered to control or turn off certain pumps if the pH gets too high, too low, or does not maintain a steady value. The automatic adjustment of acid pump settings maintains a steady pH value within the target range.

At 260, the site information is transmitted wirelessly to a server that is operably connected to the remote computer (e.g., through a network), to enable a remote user (e.g., the data analyst) to view the site information. The site information is generally transmitted at a frequency corresponding to the review frequency (e.g., daily, weekly, 2 or 3 times/week, etc.) or upon request (e.g., from a user such as a data analyst). The site information includes tank levels, pump rates, pump stroke settings, on/off times for the pumps and the apparatus, etc. At 270, the data analyst reviews the site information, generates a report (e.g., summary of the data in table form), and sends the report to the customer and/or user.

At 280, the steps 220 to 270 are repeated, periodically and/or on demand. If the process is repeated periodically, it may be repeated at the same frequency as report generation and/or report review (e.g., by the user or the customer). In some embodiments, certain steps (e.g., reading and recording tank levels and calculating usage, target outputs and pump settings 230, determining and implementing pump settings 250, measuring outputs and/or pH, adjusting acid or base, etc.) may be repeated more frequently (e.g., from every 10-15 minutes to daily, every 1-4 hours, or any time period or range of time periods therein). While the fertilizer targets may be reviewed with each report (e.g., to compare with the actual fertilizer, base or acid application rates), changes in the targets are generally made less frequently.

Exemplary Automated Irrigation and/or Fertilization Apparatuses

Figure 3:
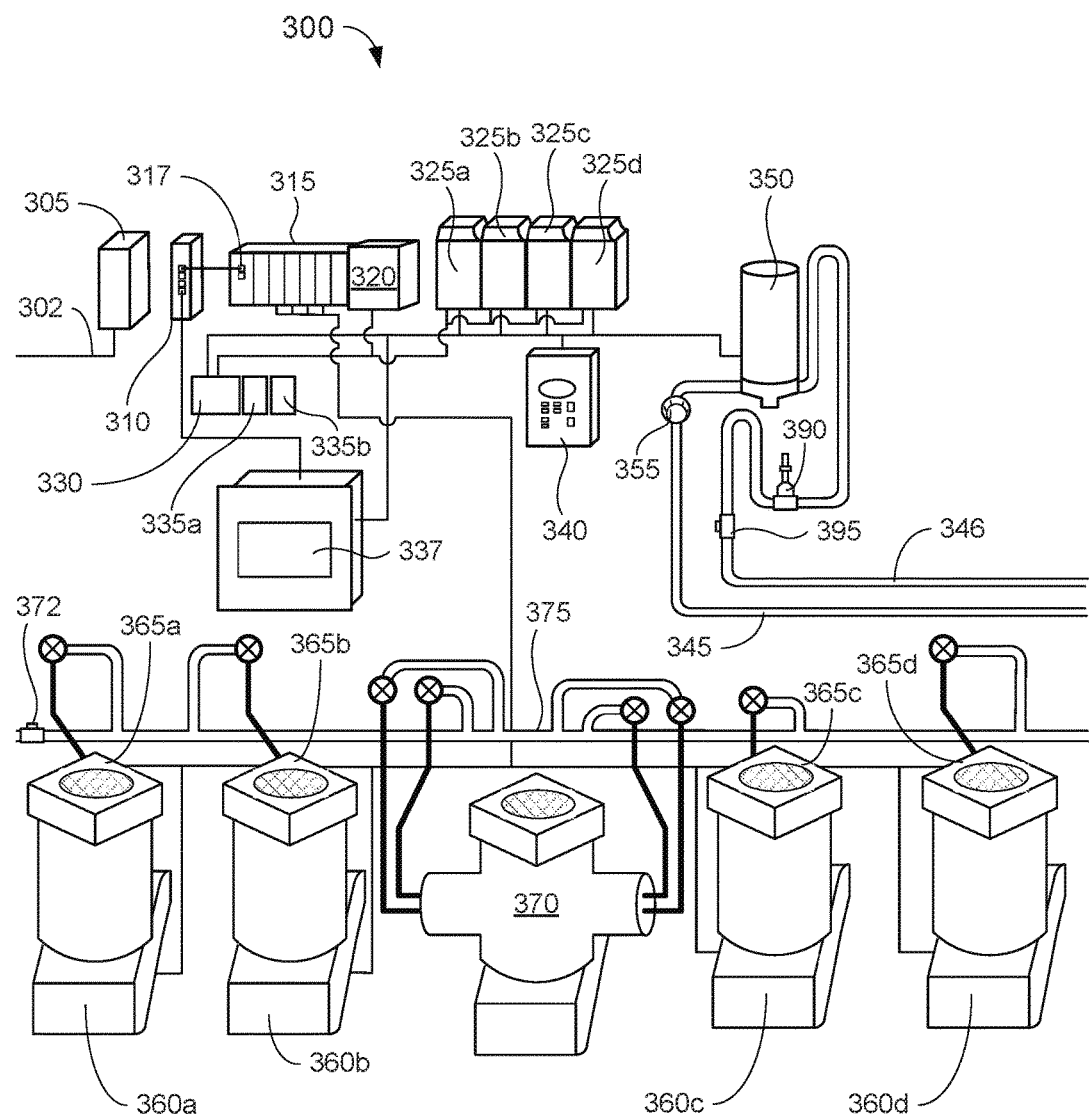
FIG. 3 shows an exemplary automatic fertilization and/or irrigation apparatus that can monitor and adjust the pH of treated irrigation water, in accordance with one or more embodiments of the present invention.

FIG. 3 shows an automatic fertilization and/or irrigation apparatus 300 comprising a power input 302, a power transformer 305, a wireless switch or router 310, a programmable logic controller (PLC) 315, a serializer/deserializer 317, an expansion module 320 for the PLC 315, first variable frequency drives 325*a-d*, wiring terminals 330, safety relays 335*a-b*, a human-machine interface (HMI) 337, a second variable frequency drive 340, a recirculation input 345, a recirculation filter 355, a recirculation pump 350, a pH probe 390, a flow switch 395, a recirculation output 346, pumps 360*a-d*, pump fans 365*a-d*, an acid pump 370, and a flow and/or pressure switch 372. The apparatus 300 further comprises a container (not shown) configured to house all of the components shown in FIG. 3. In use, the container may be sealed and/or locked, and may be configured to provide a substantially waterproof housing for the components enclosed therein. The container may comprise plastic and/or a metal, as described herein. When the container comprises plastic, a static electrical charge may build up on the container, introducing the risk of shock to personnel working with the apparatus and of short-circuiting or other damage to the components. Thus, the container may further comprise a powder coating on an exterior surface thereof, which may be adapted to dissipate or eliminate a static charge on the container. Independently, a different coating may be applied to an exterior surface of the container that is adapted to resist, reduce or inhibit corrosion of or UV damage to the container. The apparatus 300 may further comprise a system fan (not shown) configured or adapted to cool the interior environment or atmosphere of the apparatus (e.g., when in a sealed or locked container).

The power input 302 receives external electrical power and supplies electrical power to the apparatus 300. The external electrical power received by power input 302 may come from an electric power grid, such as an electrical outlet, energy storage devices such as batteries or fuel cells, generators or alternators, solar power converters, etc. The voltage and/or current on the power input 302 may depend on the specific requirements of the apparatus (e.g., 120-480 V for AC and 12-90 V for DC).

The power transformer 305 converts the electrical power from the power input 302 to a corresponding voltage, current, and/or frequency to power the load of the apparatus 300. The power transformer 305 may also regulate the voltage and/or current provided to the components of the apparatus 300. The power transformer 305 may be a power supply having multiple power outputs at varying voltages (e.g., lower voltages may be supplied to the PLC 315, while higher voltages may be supplied to the variable frequency drives 325a-d and 340, and the pumps 350, 360a-d, and 370). The power transformer 305 may also limit the current drawn by a particular load (e.g., to a component) to safe levels, shut off the current to one or more components or to the entire system in the event of an electrical fault or an alarm (e.g., from a flow and/or pressure switch 372 in the main irrigation line 375), prevent electronic noise or voltage/current surges on the input 302 from reaching the load(s), and optionally store energy to continue powering the load(s) in the event of a temporary interruption to the input 302 (e.g., provide an uninterruptible power supply). When the power transformer 305 shuts off the current due to an electrical fault or an alarm, the PLC 315 may latch or record some or all performance and (optionally) site information in an associated memory prior to or at the time of shut down. The power transformer 305 may include additional inputs and outputs for functions such as external monitoring and control (e.g., to connect a multimeter). In alternative embodiments, one or more of the electrical components of the apparatus 300 may include additional and separate power inputs 302 or power transformers 305. Connections between the power transformer 305 and the electrical components of the apparatus 300 are omitted for clarity of the drawing.

The wireless switch or router 310 is a gateway for receiving and transmitting data (e.g., digital packets including a header and a body) wirelessly to and from a network (e.g., over the internet). The wireless switch or router 310 may be connected (e.g., by a serial wire or cable, using an ethernet protocol) to a network interface (e.g., network card) in the PLC 315, and may also include or be directly connected to an antenna that transmits and receives wireless signals (e.g., to and from a cellular network, such as a 3G or LTE network).

The serializer/deserializer (SERDES) 317 connects the wireless switch or router 310 and the PLC 315, and converts (i) serial data from the wireless switch or router 310 to parallel data for processing by the PLC 315, as well as (ii) parallel data from the PLC 315 to serial data for transmission by the wireless switch or router 310. Thus, the wireless switch or router 310 may have a serial data interface, and the PLC 315 may have a parallel interface. In alternative embodiments, the switch or router 310 may transmit and receive electrical signals using a ground-based network (e.g., a cable, telephone/DSL, or fiber-optic network).

The digital packets from the PLC 315 may include site information (e.g., nutrient delivery amounts and/or rates, a pH, irrigation on/off times, differences from target values, etc.), and may be organized into a table to be stored in a database (e.g., a SQL database) on a remote server. The table may be processed by software and displayed in summary report readable by a spreadsheet program such as Microsoft® Excel.

The PLC 315 may include one or more input modules, one or more output modules, and a central processing unit (CPU), and may include one or more arithmetic logic units (ALUs). The PLC 315 may include one or more microprocessors, microcontrollers, field programmable gate arrays (FPGAs), complex programmable logic devices (CPLDs), application specific integrated circuits (ASICs), or application specific standard products (ASSPs). The PLC 315 may include volatile memory (e.g., cache memory, random access memory [RAM]), nonvolatile memory (e.g., fuses, read-only memory [ROM], erasable and programmable memory [EPROM, EEPROM, or flash memory], or a solid-state drive), or both. The nonvolatile memory (or other tangible storage medium) may store basic instructions such as a basic input/output system (BIOS), identification code, and/or a program (instructions to be executed by the CPU) that controls the pumps 360a-d and/or 370.

The input modules may receive input data from the pH sensor 390, the pumps 360a-d and 370, and sensors in or operably linked to pumps 360a-d and 370, and the output modules may transmit performance data for the apparatus 300 to the SERDES 317 and control signals to the variable frequency drives 325a-d and 340 to control the pumps 360a-d and 370. For example, if the input data (e.g., from a flow sensor operably linked to one of the pumps 360a-d) indicates that the pump is delivering too little of a fertilizer or nutrient, the program may generate performance data and/or a control signal to a corresponding one of the first variable frequency drives 325a-d to increase the speed of the pump. The performance data may be stored in the memory to be later transmitted to an end user (e.g., a data analyst) using the wireless switch or router 310.

The expansion module 320 for the PLC 315 may include inputs and outputs for both digital and analog signals. For example, some of the analog inputs may be connected to level sensors (e.g., optical or sonar level sensors) that detect the volume of liquid in chemical tanks or vessels (not shown) that provide the fertilizer, nutrient or micronutrient to the pumps 360a-d and 370. If the volume of liquid in one of the tanks or vessels is too low, an alarm may be triggered, and the program may instruct one of the variable frequency drives 325a-d and/or 340 (e.g., using one or more analog outputs of the expansion module 320) to shut off the corresponding one of the pumps 360a-d and/or the pump 370. Some of the digital inputs of the expansion module 320 may receive outputs from the HMI 337 (e.g., via the wiring terminals 330).

The program in the PLC 315 may organize the data into digital packets to be transmitted to a remote user (e.g., a data analyst) using the wireless switch or router 310. The HMI 337 is configured to output various signals (via the wiring terminals 330) to the expansion module 320 for the PLC 315, thereby allowing a user such as a field technician to change settings (e.g., fertilizer or nutrient targets, irrigation cycles, etc.) in the PLC 315 using a graphical user interface (GUI) on the HMI 337. The HMI 337 thereby functions as a user portal to the PLC 315 and the programming therein, allowing the user to make changes to the system controlled by the PLC 315 without directly making changes to the PLC programming. The GUI may be accessible using buttons and/or a touch screen. In alternative embodiments, the HMI 337 may be a smartphone, laptop, tablet or other computer application, and the PLC 315 may be connected wirelessly to the smartphone, laptop, tablet or other computer to change settings in the PLC 315.

The variable frequency drives 325a-d and 340 control the pumps 360a-d and 370, respectively, based on control signals from the PLC 315. Values and/or on-off cycles of the control signals correspond to the settings in the PLC 315 and/or the performance data stored in the PLC 315. The variable frequency drives 325a-d and 340 may vary the voltage, frequency and/or pulse width(s)/duty cycle(s) of the control signals to the pumps 360a-d and/or 370. The variable frequency drives 325a-d and 340 may be DC-AC or AC-AC systems, depending on the output of the power transformer 305. The variable frequency drives 325a-d and 340 may be pulse-width modulation (PWM) drives, current source inversion (CSI) drives or voltage source inversion (VSI)

drives. If any of the pumps 360a-d and/or 370 require pulsed signals (e.g., the pump is solenoid-driven), the PLC 315 may provide the pulsed signal(s) through one or more high-speed outputs wired to one or more corresponding optical (e.g., solid state) relays directly wired to the pump.

The wiring terminals 330 may receive wires from level sensors, power terminals, and output lines (e.g., from the HMI 337), and provide signals to other components, such as the PLC 315 (e.g., through the expansion module 320), the variable frequency drives 325a-d, and the recirculation pump 350. The safety relays 335a-b may include voltage regulators, varistors, and/or surge protectors. Additional safety relays (not shown) may be used as a fail-safe control and optionally as a de-bounce circuit configured to maintain power momentarily during false-negatives from the fail-safe control relay.

The recirculation input 345 receives sampled water to be tested and the recirculation output 346 returns the sampled water to the main irrigation line 375. The recirculation pump 350 pulls a sample of the irrigation water from the main irrigation line 375 (see, e.g., FIG. 5) through the recirculation input 345. The irrigation water sample is taken from the main irrigation line 375 at a location (not shown) downstream from the locations where the pumps 360a-d and 370 and/or the apparatus 300 introduce the fertilizers, nutrients and/or micronutrients into the main irrigation line 375. The recirculation input 345 may also include multiple bends, turns, and/or changes in dimensions to ensure thorough mixing prior to measurement of one or more parameters and/or characteristics (e.g., pH) of the irrigation water. The irrigation water sample passes through a recirculation filter 355 that may function as a flow switch to allow the water sample to flow into a monitoring system and/or as a filter to remove undissolved particles above a predetermined size (e.g., using a mesh strainer or other filtering material). The pH probe 390 measures the pH of the irrigation water sample with the fertilizers, nutrients and/or micronutrients added thereto, and may transmit the pH data to the PLC 315. The PLC 315 may then transmit the pH data to a remote computer via the wireless switch or router 310 and, depending on the difference between the measured pH and a target pH, the variable frequency drive 340 to adjust (e.g., increase or decrease the speed, frequency and/or stroke of) the pump 370. Alternatively, if one of the fertilizers, nutrients and/or micronutrients is an acid or base, a corresponding one of the variable frequency drives 325a-d may adjust the speed, frequency and/or stroke of a corresponding one of the pumps 360a-d. The flow switch 395 allows the sampled water to return to the main line through the recirculation output 346. In alternative embodiments, additional probes may determine or measure another parameter of the irrigation water sample, such as hardness, conductivity, total dissolved solids, temperature, etc.

The pumps 360a-d each control the addition of one or more fertilizer, nutrient and/or micronutrient components to the main line. For example, each of the pumps 360a-d may control the feed rate of a fertilizer, nutrient or micronutrient to the irrigation water in the main irrigation line 375. The fertilizers and/or nutrients may comprise one or more sources of nitrogen, phosphorous, potassium, carbon, and/or calcium. The micronutrients generally comprise an element or chemical provided in small or trace amounts or concentrations, such as boron, zinc, manganese, iron, copper, cobalt, magnesium, molybdenum, etc. The pumps 360a-d may also control the addition of other supporting chemicals or additives (e.g., an acid or base, etc.). The pump fans 365a-d may cool the pumps 360a-d to prevent overheating.

The pump 370 is similar or substantially identical to the pumps 360a-d, in the embodiment shown in FIG. 3, the pump 370 is larger than the other pumps 360a-d to provide a higher output than the other pumps, but in many cases, the pump 370 is identical to or smaller than the other pumps 360a-d. In one example, the pump 370 controls the addition of acid to the main irrigation line 375. Alternatively, the pump 370 may control the addition of base or a relatively high-volume fertilizer and/or nutrient, such as a nitrogen- or potassium-containing fertilizer and/or nutrient, to the main irrigation line 375. Each of the pumps 360a-d and 370 may include an AC motor electrically connected to the variable frequency drives 325a-d and/or 340. Each of the pumps 360a-d and 370 may be connected to a chemical tank (e.g., the fertilizer/nutrient tanks 515a-d or the acid tank 520 shown in FIG. 5) using feed lines. Each of the pumps 360a-d and 370 may be a positive displacement or a centrifugal pump, although the pumps 360a-d and 370 are not limited thereto.

The advantages of the present apparatus 300 are described below. For example, all information can be recorded automatically and transmitted using a cellular network, and may be accessed at any time (e.g., using a computer or mobile device). The automatic logging of data can occur at adjustable time intervals. Information may be transmitted automatically to field technicians, data analysts, managers, customers and other users using short message service (SMS, e.g., cellphone texts), email, etc., to inform the users of important alerts.

The present apparatus 300 enables a user to know when a site is running. For example, the PLC 315 may detect a positive flow rate in the main line using a flow sensor. This ability allows a field technician to visit a site only when it is in operation. This ability is important since manual adjustments to components of the apparatus 300 are most effectively made when water is flowing through the main line.

All pertinent information for the site (e.g., the site name, acreage, fertilizer/nutrient targets, and irrigation hours) can be stored in both the PLC 315 and in a remote computer or server. This redundancy of information storage reduces errors in transferring and processing information. All such information may be accessed or changed remotely at any time.

The present apparatus 300 can perform pH calibration using any number of points (e.g., 1, 2, 3, or any number of 1 or more; more pH calibration points providing for a more accurate pH measurement), and the calibration points may be adjustable. Calibration errors can be indicated (e.g., by an alarm), and a reason may be given for the error (e.g., a malfunctioning pH probe, improper calibration standard, etc.). For example, alarms for the connectivity of the pH probe 390 and inappropriate signal conditions can be indicated.

Set-up of acid (e.g., $H_2SO_4$, although any acid may be used) and base (e.g., KOH, although any base may be used) for neutralization (e.g., pH balancing) may be performed automatically in the present apparatus 300 by initiating operation of the acid and base pumps (e.g., one of the pumps 360a-d providing the base and the acid pump 370) at a relatively low speed or feed rate (e.g., a minimum speed or rate), then slowly increasing the speed of the acid and base pumps with the corresponding variable frequency drives (e.g., one of the VFDs 325a-d and the VFD 340) while monitoring the pH of the resulting irrigation water until the base (e.g., KOH) attains its target setting, unless the pH falls outside a predetermined and/or desired range, in which case the acid is adjusted (e.g., the speed of the acid pump 370 is increased or decreased) to bring the pH within the predetermined and/or desired pH range. All parameters are adjustable. Any subsequent automatic changes in the base feed rate (e.g., KOH pump output) may be executed slowly to allow for the control of the pH without large fluctuations.

Fertilizer, nutrient and other chemical tank levels may be measured using sonar or optical sensors. The accuracy of this measurement is controlled or determined only by the sensor accuracy (e.g., the approximate accuracy of conventional and/or state-of-the-art sonar sensors is +/−0.125 inches). This measurement avoids errors related to human measurements from a baseline (e.g., the bottom of the tank, the ground, and/or the height of the liquid along the sides of the tank).

The present apparatus 300 enables continuous tank level monitoring, which also provides the ability to detect tank leaks before a large amount of material has left the tank. Automated monitoring detects a significant change in a tank level that cannot be explained by normal usage, and can trigger an alarm that may be transmitted using SMS, email, etc., to one or more persons (e.g., a field technician, data analyst or account manager) to notify the person(s) that corrective action may be necessary. Also, when a tank level sensor determines that the chemical tank is empty (or nearly empty), the PLC 315 can set the corresponding variable frequency drive 325a-d or 340 to zero, and transmit a notice to a user (e.g., the data analyst) to take corrective action (e.g., to ship or send the corresponding fertilizer[s], nutrient[s] and/or micronutrient[s] to the site). This action also prevents the corresponding pump 360a-d or 370 from running dry, which may cause significant damage.

The outputs of the pumps 360a-d and 370 may be frequently or continually monitored by the PLC 315, which can send one or more commands to the corresponding variable frequency drive(s) 325a-d and 340 to change the pump speed, and optionally a servo/stepper motor-type control of the stroke setting, thereby changing the pump output (e.g., to meet a defined or modified volumetric demand). Over- and under-feeds can be minimized (typically less than 2%) based on weekly targets, resulting in nearly linear feed rates (e.g., over the course of a growing schedule or crop cycle). This ability has been tested under rigorous and/or extreme conditions, such as very high feed rates, short irrigation times, and/or severely inaccurate pump performance (e.g., greater than 40% from theoretical). Overheating of the pumps 360a-d is prevented by the cooling fans 365a-d mounted to each of the pumps 360a-d.

The output of each pump may be calculated automatically by the PLC 315, based on fertilizer/nutrient targets, flow rates, concentrations of fertilizers/nutrients in the tanks, irrigation hours (e.g., irrigation water and fertilizer/nutrient pump on/off times), etc., thus reducing the possibility of human error. A theoretical pump stroke setting is calculated and recommended to the user (e.g., field technician, farm manager, customer, etc.). Pump outputs may be adjusted remotely at any time. Pump performance may be monitored periodically (e.g., every 3 minutes, 15 minutes, hour, 2 hours, 4 hours, etc.) or continuously, and alarms may be triggered for poorly performing pumps. Alarms such as pump alarms, pH alarms and irrigation flow alarms can be configured to shut down the entire system, and optionally, latch or record some or all system information in an on-board memory (e.g., in case power is shut off or disconnected).

The present apparatus 300 enables a user to enter a pump correction factor to account for a known (e.g., empirically determined) performance deficiency in a pump. This ability allows for the system to more accurately feed a fertilizer, nutrient or micronutrient and to determine the amount of fertilizer, nutrient or micronutrient supplied to the irrigation water over a given length of time. All calculations can be performed by the PLC 315 and/or a remote computer to reduce errors. Summary reports can be generated and/or transmitted automatically, periodically (e.g., at adjustable time intervals) or on demand.

The present apparatus 300 may include fail-safe controls to ensure that irrigation water is flowing when the apparatus 300 is operational. This can be accomplished by a flow-and-pressure switch in the irrigation water main line. Fail-safe controls to ensure functionality of the recirculation pump may be accomplished using a flow switch 355 (e.g., configured to allow irrigation water to flow from the main line to the recirculation pump 350 when water is flowing) in the recirculation line 345. In the example in FIG. 3, the flow switch 355, the recirculation pump 350 and the recirculation line 345 draw treated water (to which the fertilizers, nutrients and micronutrients have been added) from the irrigation line 375 to be analyzed for pH. If the flow-and-pressure switch in the irrigation water main line of the flow switch 355 is not triggered, the corresponding pumps are turned off by removing power from the pumps. However, the variable frequency drives may remain on. Thus, the fail-safe controls may prevent the variable frequency drives from shutting down. A delay (e.g., of 1-60 seconds, or any value or range of values therein, such as 10 seconds) to keep components of the apparatus 300 operational in the temporary absence of electrical power may be accomplished by an electronic de-bounce circuit, as discussed herein. A secondary fail-safe may be triggered by the same conditions (e.g., lack of flow or pressure in the main line, or lack of flow in the recirculation line 245), resulting in the speed of each pump being set to zero on the variable frequency drive after a predetermined and/or adjustable length of time.

Fail-safe control for pH is accomplished by setting the variable frequency drive to zero for either the acid pump or the base pump if the pH is too low or too high, respectively. This action prevents the drive(s) for the acid and/or base pumps from shutting down. Stopping the acid or base pumps can result in wild swings in pH. If the pH goes above or below the acceptable range more than a predetermined number of times, the apparatus 300 may return to a slow start mode, in which the acid and base pumps are set to their minimum settings. The speed of the acid and base pump is then either increased or kept constant to ensure that the pH stays within the desired range. When the base pump (e.g., providing KOH to the irrigation water) attains its target setting, the acid pump can then be adjusted independently to maintain the desired pH set point. All such parameters may be adjustable. This method for controlling the pH of irrigation water using the present apparatus 300 has been proven to be very effective in maintaining the pH of the treated irrigation water in the desired range (e.g., 6.5±0.5, or any range within this range).

Figure 4:
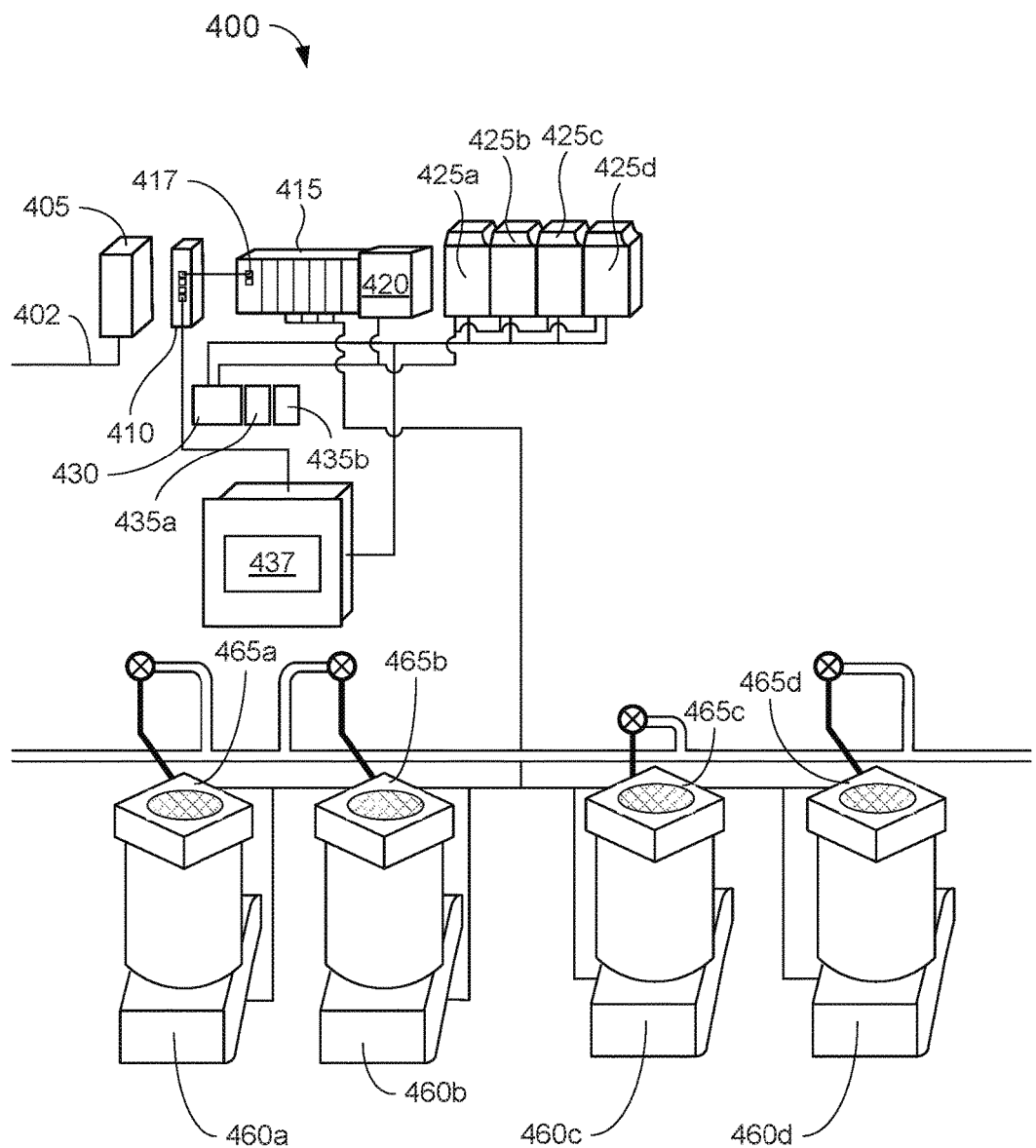
FIG. 4 shows an alternative example of an automatic fertilization and/or irrigation apparatus that does not monitor or adjust the pH of treated irrigation water, in accordance with one or more embodiments of the present invention.

FIG. 4 shows a simpler alternative apparatus 400 that is similar to the apparatus 300 of FIG. 3, but in which does not monitor or adjust the pH of the treated irrigation water. The apparatus 400 may be particularly useful for fields in which substantially any fertilizer(s), nutrient(s) and/or micronutrient(s) can be applied, without a need for pH control. Thus, the apparatus 400 is generally simpler and/or less costly than the apparatus 300 shown in FIG. 3. The apparatus 400 in FIG. 4 is also useful for applying customer-fed materials, and for crops that are not permanent such as tomatoes, onions, and the like, where the irrigation and fertilization systems may be moved frequently for each crop cycle.

The apparatus 400 of FIG. 4 is substantially similar or identical to the apparatus 300 of FIG. 3, except that the acid/base pump 370, the variable frequency drive 340, the pH probe 390 and the recirculation pump 350 and associated hardware are not present. Otherwise, the power input 402, the power transformer 405, the wireless switch or router 410, the PLC 415, the serializer/deserializer 417, the expansion module 420, the variable frequency drives 425a-d, the wiring terminals 430, the safety relays 435a-b, the HMI 437, the pumps 460a-d, and the pump fans 465a-d are similar or identical to the power input 302, the power transformer 305, the wireless switch or router 310, the PLC 315, the serializer/deserializer 317, the expansion module 320, the variable frequency drives 325a-d, the wiring terminals 330, the safety relays 335a-b, the HMI 337, the pumps 360a-d, and the pump fans 365a-d in FIG. 3. Because pH is not monitored by the apparatus 400, there is no need (and in many cases, no benefit) to using KOH as a source of potassium and sulfuric acid as a source of sulfur. However, if desired or necessary, a recirculation input, recirculation filter, recirculation pump, flow switch, and recirculation output similar or identical to the recirculation input 345, the recirculation filter 355, the recirculation pump 350, the flow switch 395 and the recirculation output 346 in FIG. 3 can be added to the apparatus 400, and the pH probe 390 can be replaced with one or more different probes (e.g., for hardness, conductivity, salinity, etc.), to monitor one or more qualities of the treated irrigation water other than pH.

An Exemplary Automated Fertigation and/or Irrigation System

Figure 5:
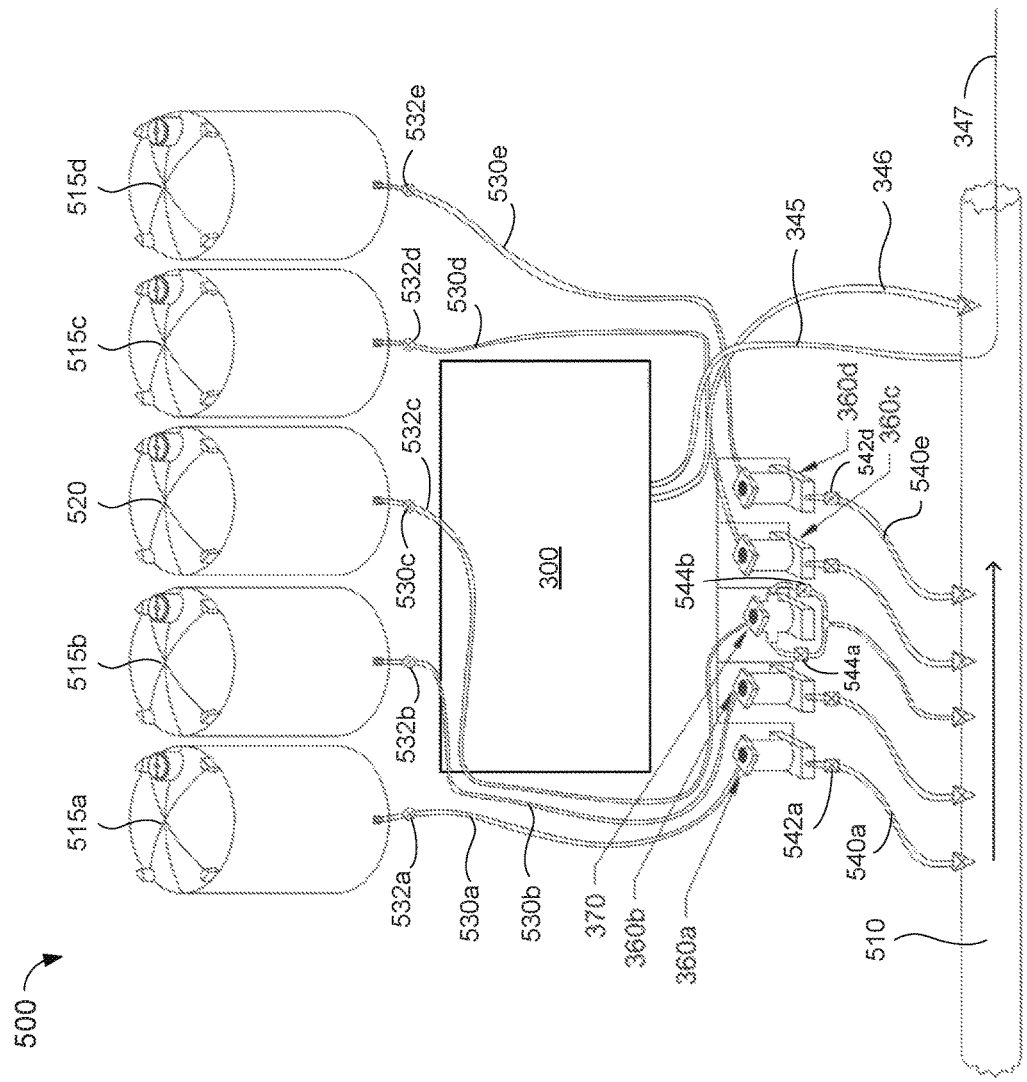
FIG. 5 shows an exemplary automatic fertilization and/or irrigation system including the exemplary apparatus shown in FIG. 3, in accordance with one or more embodiments of the present invention.

FIG. 5 shows an exemplary automatic fertilization and/or irrigation system 500 including the exemplary automated apparatus 300 shown in FIG. 3, configured to controllably add a plurality of fertilizers, nutrients and/or micronutrients to irrigation water and to control the pH of the treated irrigation water. The automatic fertilization and/or irrigation system 500 includes, in addition to the automatic fertilization and/or irrigation apparatus 300, a plurality of fertilizer, nutrient and/or micronutrient tanks 515a-d, an acid tank 520, a main irrigation water line 510, a plurality of fertilizer, nutrient and/or micronutrient supply conduits 530a-e, and a plurality of fertilizer, nutrient and/or micronutrient feed conduits 540a-e. However, the automatic fertilization and/or irrigation system 500 can also be adapted for use with the exemplary automated apparatus 400 shown in FIG. 4.

Each of the tanks 515a-d is adapted to contain and supply of an aqueous solution of one or more fertilizers and/or nutrients, and/or (optionally) one or more micronutrients. Typically, a first one of the tanks 515a-d contains and supplies a nitrogen-containing fertilizer and/or nutrient, a second one of the tanks 515a-d contains and supplies a phosphorous-containing fertilizer and/or nutrient, and a third one of the tanks 515a-d contains and supplies a potassium-containing fertilizer and/or nutrient, although other configurations are possible. In many cases, the tanks 515a-d that contain and supply the nitrogen-containing, phosphorous-containing and/or potassium-containing fertilizer and/or nutrient also contain and supply one or more additional fertilizers and/or nutrients, as described herein. In many embodiments, a fourth one of the tanks 515a-d may contain and supply a micronutrient mixture. Alternatively, one of the tanks 515a-d may contain and supply the acid or base, alone (e.g., aqueous sulfuric acid) or in combination with a nitrogen-containing, phosphorous-containing and/or potassium-containing fertilizer and/or nutrient (e.g., aqueous phosphoric acid or aqueous KOH).

The acid tank 520 in the embodiment shown in FIG. 5 contains and supplies a concentrated acid, for continuously adjusting untreated irrigation water having a neutral or slightly alkaline pH to a neutral or slightly acidic pH. In one example, the acid tank 520 contains and supplies concentrated aqueous sulfuric acid, but other acids are also acceptable (e.g., concentrated aqueous phosphoric acid, which also provides phosphorous; concentrated aqueous nitric acid, which also provides nitrogen; aqueous formic acid, which also provides carbon and may reduce or eliminate scaling; etc.). Alternatively, when the tank 520 has a larger volume that some or all of the tanks 515a-d, the tank 520 may contain and supply a relatively high-volume fertilizer and/or nutrient (e.g., a nitrogen- and/or potassium-containing fertilizer and/or nutrient), and one of the tanks 515a-d may contain and supply the acid or base, as described herein.

Each of the fertilizer, nutrient and/or micronutrient supply conduits 530a-e includes a corresponding first valve 532a-e configured to control (e.g., open, close, and optionally restrict) a flow of the corresponding fertilizer, nutrient and/or micronutrient from the corresponding tank 515a-d or 520 to a unique or corresponding one of the pumps 360a-d and 370. Each of the fertilizer, nutrient and/or micronutrient feed conduits 540a-b and 540d-e includes a corresponding second valve 542a-d configured to control the addition of the corresponding fertilizer, nutrient and/or micronutrient by the corresponding pump 360a-d or 370 to the main irrigation line 510. The fertilizer, nutrient and/or micronutrient feed conduit 540c may have two valves 544a-b configured to control the addition of the acid (or, alternatively, a relatively high-volume fertilizer and/or nutrient) to the main irrigation line 510.

As shown in FIG. 5, the recirculation input 345 can include a sampling conduit 347, configured to withdraw a sample of the treated irrigation water a predetermined distance (e.g., 3-40 feet, 1-10 m, or any distance or range of distances therein) along the main irrigation water line 510. The recirculation output 346 returns the sampled treated irrigation water to the main irrigation water line 510 in the same or a similar manner as the feed conduits 540a-e.

Modes of Operation

The present apparatus (e.g., the apparatus 300 or 400) may be operated in one of a plurality of different modes: continuous mode, intermittent mode, and slug mode. In continuous mode, the water in the main irrigation line is continuously treated with small amounts of one or more fertilizers, nutrients and/or micronutrients. Thus, all of the water that reaches the crops from the main irrigation line includes fertilizer(s), nutrient(s) and/or micronutrient(s). In intermittent (e.g., semi-continuous) mode, the water in the main irrigation line is treated intermittently with one or more fertilizers, nutrients and/or micronutrients (e.g., twice a day, once a day, once a week, once every two weeks, etc.). Thus, some of the water that reaches the crops from the main irrigation line is treated with fertilizer(s), nutrient(s) and/or micronutrient(s), and some is not. In slug mode, the water in the main irrigation line is treated with a very large amount of fertilizer(s), nutrient(s) and/or micronutrient(s) a predetermined number of times (e.g., once, twice, 3 times, 4 times, etc.) during a growing season. At the same or a later time, one or more of the same and/or different fertilizers, nutrients and/or micronutrients may be added to the water in the main irrigation line.

The apparatus 300 or 400 may combine the continuous, intermittent, and/or slug modes. For example, the water in the main irrigation line may be treated with one or more fertilizers, nutrients and/or micronutrients in slug mode at the start of the irrigation cycle, and then treated with one or more of the same or different fertilizers, nutrients and/or micronutrients in continuous mode at a later point in the irrigation cycle.

Continuous mode uses the fertilizers, nutrients and/or micronutrients most efficiently since crops generally have a fixed requirement rate (e.g., 50 grams per day for a single plant) for the fertilizers, nutrients and/or micronutrients. Continuous mode treats the irrigation water with an optimal and/or optimized amount of fertilizer for the crop (e.g., the amount of fertilizer used by that crop in a day, week, month, etc.), and thus minimizes or avoids overfeeding or underfeeding the crop. By comparison, in a manual system, fertilizer is generally fed at a much faster rate. As a result, the crop may not be able to metabolize the relatively large level of fertilizer, nutrient and/or micronutrient. If a rain event occurs, the excess fertilizer(s), nutrient(s) and/or micronutrient(s) may be washed away from the soil. Subsequent irrigations without fertilizer, nutrient or micronutrient may also wash excess fertilizer(s), nutrient(s) and/or micronutrient(s) away from the soil.

Exemplary Fertilizers, Nutrients and Micronutrients

The apparatus 300 or 400 may treat the irrigation water with any water-soluble fertilizer, nutrient, micronutrient, or combination thereof. Typical fertilizers and nutrients may include sources of elements such as nitrogen, phosphorus and potassium, optional sources of elements such as calcium, sulfur, magnesium and carbon, soluble organic materials, soluble soil amendments, microbiologicals, etc. Sources of nitrogen may include water-soluble compounds such as ammonia (which can also be a base), ammonium nitrate and ammonium chloride; urea, formamide, acetamide and ammonium carbonate (each of which can also be a source of carbon); ammonium phosphate (which can also be a source of phosphorous), ammonium sulfate (which can also be a source of sulfur), and alkaline earth ammonium halides such as calcium ammonium chloride and calcium ammonium nitrate (which can also be a source of calcium), magnesium ammonium chloride and magnesium ammonium nitrate (which can also be a source of magnesium), etc. Sources of phosphorus may include phosphoric acid and phosphonic acid (each of which can also be an acid), ammonium phosphate, ammonium phosphonate, alkali metal mono-, di- and tribasic phosphates and phosphonates such as lithium mono-, di- and tribasic phosphates, sodium mono-, di- and tribasic phosphates, and potassium mono-, di- and tribasic phosphates and phosphonates (which can also be a source of potassium), etc. Sources of potassium may include potassium hydroxide, potassium carbonate and potassium bicarbonate (each of which can also be a base, and the latter two of which can also be a source of carbon), potash, potassium chloride, potassium nitrate (which can also be a source of nitrogen), potassium phosphate, potassium sulfate and potassium thiosulfate (each of which can also be a source of sulfur), etc. Sources of calcium may include calcium nitrate, calcium ammonium nitrate and calcium ammonium chloride (each of which can also be a source of nitrogen), calcium chloride, dibasic calcium phosphate (which can also be a source of phosphorous), calcium formate and calcium acetate (each of which can also be a source of carbon), and calcium thiosulfate (which can also be a source of sulfur), etc. Sources of sulfur may include ammonium sulfate and ammonium sulfide (each of which can also be a source of nitrogen), alkali metal sulfates and sulfides (such as potassium sulfate and potassium sulfide, which can also provide a source of potassium), alkaline earth sulfates and sulfides (which, in the cases of calcium and magnesium, can also provide a source of calcium and magnesium, respectively), etc. Sources of magnesium may include magnesium chloride, magnesium formate and magnesium acetate (each of which can also be a source of carbon), magnesium sulfate and magnesium thiosulfate (each of which can also be a source of sulfur), etc. Sources of carbon may include, in addition to those listed herein, carbon dioxide (carbonic acid), formic acid, acetic acid, oxalic acid, malonic acid, acetoacetic acid (3-oxobutyric acid), etc., alkali metal and alkaline earth metal salts thereof, soluble carbohydrates, etc.

Micronutrients include sources of certain minerals and elements that are applied in relatively low concentrations (e.g., at molar ratios of 1:20 or less, 1:50 or less, 1:100 or less, 1:200 or less, etc., relative to each fertilizer and/or nutrient), and may include sources of elements such as boron, iron, cobalt, copper, manganese, molybdenum and zinc, and, to the extent not included in the fertilizers and nutrients, sources of calcium, sulfur, magnesium and carbon. Micronutrients such as boron, iron, cobalt, copper, manganese, molybdenum and zinc may be present as a water-soluble oxide or hydroxide (alone or, in the case of the metals, as a complex with, e.g., ammonia, water, etc., and/or chelated with EDTA, NTA, oxalic acid, malonic acid or a dialkyl ester thereof, etc.), and in the cases of the metals, a corresponding halide salt (alone or as a complex with, e.g., ammonia, water, etc., and/or chelated with EDTA, NTA, oxalic acid, malonic acid or a dialkyl ester thereof, etc.), sulfate, phosphate, carbonate, formate, acetate, oxalate, etc. Sources of calcium, sulfur, magnesium and carbon may be a disclosed herein (e.g., see the preceding paragraph). Other components that may be included water-soluble pesticides, herbicides (e.g., that are selective for weeds and relatively less toxic or non-toxic to the crop[s]), antifungal agents, antimicrobial agents and/or other biocides (e.g., ammonium phosphite), antiviral agents, antiscaling agents, etc.

For improved economic benefit, some fertilizers may be synthesized at or near the site of the apparatus 300 or 400. For example, potassium sulfate may be synthesized by reacting potassium hydroxide solution (50% by weight) with sulfuric acid solution (93% by weight):

$$2KOH + H_2SO_4 \rightarrow 2K^+ + SO_4^{-2} + 2H_2O$$

For additional economic benefit, it may be beneficial to add incompatible fertilizers together at the site of the apparatus 300 or 400 (e.g., in the irrigation water) to reduce or prevent scaling and/or plugging, as some fertilizers and/or nutrients may form insoluble or sparingly soluble precipitates when combined. For example, calcium phosphate is substantially insoluble in pH-neutral water, but equivalent species may be synthesized in situ in the irrigation water, for example by combining calcium nitrate solution (75% by weight) with phosphoric acid solution (75% by weight) at certain dilutions and/or concentrations and at mildly acidic pH (e.g., ≥6.0 but <7.0):

$$3Ca(NO_3)_2 + 2H_3PO_4 \rightarrow 3Ca^{2+} + 2[H_2(PO_4)^- \text{ and/or } H(PO_4)^{2-}] + 6H^+ + 6NO_3^-$$

As mentioned above, any fertilizer, nutrient or micronutrient may be fed to the irrigation water using the apparatus 300 or 400. Thus, any commercial, water-soluble fertilizer may be fed alone or in combination with other water-soluble fertilizers, nutrients and additives, thereby avoiding the conventional problems encountered by growers (e.g., from slug feeding and consequent losses due to incomplete absorption or weather, or scaling and/or plugging due to simultaneous addition of incompatible fertilizers and/or nutrients). As a result, standard fertilizers such as CAN-17, UAN-32, CN-9, N-pHuric, AN-20, Thiocal, potassium thiosulfate, urea, potash, phosphoric acid, sulfuric acid, and other commodity/commercially available fertilizers and additives may be applied simultaneously in irrigation water using the apparatus 300 or 400. The precise, self-correcting, flexible and/or instantaneous control enabled by the present invention results in increased efficiency, larger crop yields, and lower labor costs.

Exemplary Operation

Before the apparatus 300 or 400 is operated, the tanks are installed and filled with fertilizers, nutrients and/or micronutrients in known concentrations and amounts, and site information (e.g., nutrient targets, irrigation cycles and/or times, etc.) is entered into the programmable logic controller (e.g., the PLC 315 of FIG. 3 or the PLC 415 of FIG. 4). An exemplary irrigation system may include up to six tanks: a tank for base (e.g., a 6500-gallon tank containing 50% by weight aqueous KOH), a tank for acid (e.g., a 2500-gallon tank containing 93% by weight aqueous sulfuric acid), a tank for one or more nitrogen-containing fertilizers and/or nutrients and optionally a second fertilizer and/or nutrient (e.g., a 6500-gallon tank containing aqueous calcium ammonium nitrate, providing 10-30% by weight of nitrogen and 5-12% by weight of calcium), a tank for one or more phosphorous-containing fertilizers and/or nutrients (e.g., a 6500-gallon tank containing aqueous phosphoric acid, providing 20-50% by weight of phosphorous measured as $P_2O_5$), a tank for one or more secondary fertilizers and/or nutrients (e.g., a 6500-gallon tank containing calcium formate, calcium acetate, calcium oxalate and/or calcium nitrate providing 2-10% by weight of calcium [measured as Ca] and 0-10% of carbon), and a tank for micronutrients (e.g., a 3000-gallon tank containing sources of boron, iron, cobalt, copper, manganese, molybdenum and zinc, providing up to 5% by weight of boron [measured as B], up to 2% by weight of iron [measured as Fe], up to 0.1% by weight of cobalt [measured as Co], up to 4% by weight of copper [measured as Cu], up to 1% by weight of manganese [measured as Mn], up to 0.125% by weight of molybdenum [measured as Mo], and up to 5% by weight of zinc [measured as Zn], all of which [except for boron] may be chelated, for example with EDTA and/or NTA). A tank for one or more potassium-containing fertilizers and/or nutrients and optionally one or more third fertilizers and/or nutrients may also be present (e.g., a 6500-gallon tank containing aqueous potassium hydroxide or aqueous potassium formate, providing 10-42% by weight of potassium [as $K_2O$] and, for aqueous potassium formate, 3-11% by weight of carbon).

Initiation and/or startup of the apparatus 300 or 400 may comprise the following steps. First, the irrigation water pump is turned on, and the irrigation water begins to flow through the main irrigation line. Next, the PLC 315 or 415 senses water flow and pressure in the main irrigation line, as described herein. Once the required flow and pressure is achieved in the main irrigation line, the PLC 315 begins to control a first pump that adds acid or base (e.g., concentrated sulfuric acid or concentrated aqueous KOH) to the main irrigation line to bring the pH of the irrigation water to a target pH, while monitoring the pH of the irrigation water, continuously or periodically. (The apparatus 400 is not configured for pH control, and therefore does not perform this step.) The addition of acid or base is controlled (e.g., adjusted, increased or decreased slowly) until a stable pH at the target value, plus or minus a predetermined margin (e.g., $\leq \pm 0.5$) is achieved. When the acid or base is or comprises sulfuric acid, it may also be a first sulfur-containing fertilizer or nutrient. Similarly, when the acid or base is or comprises KOH, it may also be a first or second potassium-containing fertilizer or nutrient.

Although any target pH may be achieved, crops in a particular region tend to metabolize most fertilizers, nutrients and micronutrients most efficiently at a particular pH. For example, in California, irrigation water may have a pH in the range of 7.5-8.5, but many crops metabolize most or all fertilizers, nutrients and micronutrients most efficiently at a pH of about 6.5 (e.g., 6.5±0.5, 6.5±0.3, 6.5±0.2, or any other range within the target pH±0.5). Thus, in California, the target pH is typically about 6.5, and the PLC 315 controls the rate of addition of acid and/or base to the irrigation water until the irrigation water is at the target pH or in the target pH range for a predetermined minimum period of time (e.g., 1 minute, 5 minutes, 15 minutes, 1 hour, or any other minimum length of time of at least 1 minute).

Once the target pH is achieved (or, in the case of the apparatus 400, when the required flow and pressure is achieved in the main irrigation line), the PLC 315 or 415 begins adding, then controlling the rate of addition of, a first fertilizer and/or nutrient using a second pump. The first fertilizer and/or nutrient may be or comprise a first potassium-containing fertilizer and/or nutrient (e.g., concentrated aqueous KOH [42% as K2O], an aqueous solution of a conventional 0-0-21 or 0-0-42 fertilizer [e.g., potassium formate], potash, potassium acetate, etc.). When the first fertilizer and/or nutrient is or comprises potassium formate or potassium acetate, it may also be a first carbon-containing fertilizer or nutrient.

When the first fertilizer and/or nutrient is or comprises concentrated aqueous KOH (e.g., in the apparatus 300), the pH of the irrigation water may increase when it is added, so the KOH-containing fertilizer and/or nutrient is added slowly at first, the pH is adjusted (e.g., by adding sufficient acid to bring the pH back to the target pH or pH range), and the rate of the KOH-containing fertilizer and/or nutrient added by the second pump to the irrigation water is gradually increased (with corresponding or concomitant increases in the rate or amount of acid added) until the target rate of potassium is being added to the irrigation water. The heat of dissolution of the acid and base (i.e., the dissolution exotherm) and the heat of reaction between the simultaneously added acid and base (i.e., the reaction exotherm) may be dampened or dissipated relatively quickly by the relatively large volume of irrigation water to which the acid and base are added (see, e.g., U.S. Pat. No. 8,568,506, the relevant portions of which are incorporated herein by reference). However, even when the first fertilizer and/or nutrient is or comprises a potassium source other than KOH (e.g., potassium formate or acetate), the pH is still generally monitored and adjusted in the apparatus 300 to ensure compliance with the target pH or pH range.

Thereafter, in either the apparatus 300 or the apparatus 400, the PLC 315 or 415 then begins adding, then controlling the rate of addition of, a second fertilizer and/or nutrient by a third pump. The second fertilizer and/or nutrient may be or comprise a first phosphorus-containing fertilizer and/or nutrient (e.g., aqueous ammonium phosphate, concentrated aqueous phosphoric acid [in the apparatus 300], etc.). When the second fertilizer and/or nutrient is or comprises ammonium phosphate, it may also be a first or second nitrogen-containing fertilizer or nutrient. When the second fertilizer and/or nutrient is or comprises phosphoric acid, the pH of the irrigation water may decrease, so the PLC 315 may adjust the rate of acid using the pump 370 to bring the pH back to the target pH or pH range. (In general, the apparatus 400 may be configured so that it does not add a fertilizer and/or nutrient that is also an acid or base having a significant pH-changing affect [e.g., that is expected to change the pH of the treated irrigation water to a value outside a range of 5.0-8.5].)

In either the apparatus 300 or the apparatus 400, the PLC 315 or 415 may then begin adding, then controlling the rate of addition of, a third fertilizer and/or nutrient by a fourth pump. The third fertilizer and/or nutrient may be or comprise a first nitrogen-containing fertilizer and/or nutrient (e.g., aqueous ammonium nitrate, aqueous calcium ammonium nitrate, etc.). When the third fertilizer and/or nutrient is or comprises calcium ammonium nitrate, it may also be a first or second calcium-containing fertilizer or nutrient. In the apparatus 300, the pH of the irrigation water is monitored, and if necessary, the PLC 315 may increase or decrease the rate of addition of acid or base using the first pump to bring the pH back to the target pH or pH range. In some cases, the PLC 315 may increase or decrease the rate of addition of acid or base using the second or third pump, but caution should be taken not to overfeed a corresponding fertilizer and/or nutrient at any time or underfeed a corresponding fertilizer and/or nutrient over a prolonged period of time.

Once the target level of nitrogen-containing fertilizer(s) and/or nutrient(s) is achieved, the PLC 315 or 415 may determine that no more nitrogen should be added. However, the PLC 315 or 415 may determine that a target rate or amount of calcium may not yet be met. The PLC 315 or 415 may then begin adding, then controlling the rate of addition of, a fourth, calcium-containing fertilizer and/or nutrient (e.g., calcium chloride, calcium sulfate, calcium thiosulfate, calcium formate, calcium acetate, etc.) using a fifth pump until the target level of calcium is achieved in the irrigation water. When the fourth fertilizer and/or nutrient is or comprises calcium sulfate or calcium thiosulfate, it may also be a first or second sulfur-containing fertilizer or nutrient. When the fourth fertilizer and/or nutrient is or comprises calcium formate or calcium acetate, it may also be a first or second carbon-containing fertilizer or nutrient. The pH of the irrigation water may be monitored and adjusted in the apparatus 300 as described herein when the calcium-containing fertilizer and/or nutrient is slightly acidic or basic.

The PLC 315 or 415 may determine that micronutrients (e.g., a mixture of magnesium, boron, iron, cobalt, copper, manganese, molybdenum and/or zinc) should be added. The target level(s) of micronutrients is obtained by the PLC 315 or 415 initiating the addition of the micronutrients using one or more fifth or sixth pumps, and adjusting the rate of addition of the micronutrients with the corresponding pump(s) until the target level(s) of micronutrients are achieved in the irrigation water. Throughout this process, in the apparatus 300, the pH of the irrigation water is maintained at the target pH or in the target pH range, as described herein.

However, the PLC 315 or 415 may determine (e.g., based on a programmed and/or predetermined feeding schedule for each of the fertilizers, nutrients and/or micronutrients) that it is too early or too late in the season to add one or more of the fertilizers, nutrients and/or micronutrients to the irrigation water (e.g., a fertilizer and/or nutrient is to be added only after a first predetermined date, or is not to be added after a second predetermined date). In such cases, the PLC 315 or 415 turns (and/or keeps) the corresponding pump(s) off.

When the main irrigation water pump shuts off, the PLC 315 or 415 senses a decrease in pressure in the main irrigation water line, and consequently shuts down all of the pumps. In some embodiments, the PLC 315 or 415 shuts down the pumps slowly (e.g., in accordance with predetermined decreases, or a predetermined rate of decrease, in the pressure or flow rate in the main irrigation water line). The apparatus 300 may do so while maintaining the pH of the irrigation water at the target pH. When the PLC 315 or 415 determines a no-flow condition, the apparatus 300 or 400 turns off, and the irrigation system is shut down.

The PLC 315 or 415 may send a report to an email account (using the wireless switch or router 310 or 410) specifying the levels or amounts of each fertilizer, nutrient and micronutrient added to the irrigation water. For example, the levels (or amounts per unit area) of the fertilizers, nutrients and micronutrients may be calculated and reported in units of lbs./acre (e.g., to the nearest 0.1 lb./acre), $kg/km^2$, $mg/m^2$, etc. When the email is received by a remote computer adapted to receive and process such reports, if the report contains no errors (e.g., errors that are detectable by the remote computer having a software program or app thereon configured to receive and process such reports), then the report may be automatically forwarded to one or more further recipients (e.g., a customer, an account manager, a field technician, etc.).

In some cases, the irrigation water pump may be turned on or off (e.g., manually) for a period of time different from that specified in the programming or data entered into the PLC 315 or 415. In such cases, the apparatus 300 or 400 has no control or advance knowledge of the time interval during which the irrigation pump is run or operated, but can respond adjustably to underfeeds and overfeeds resulting from a difference between the expected and actual time intervals of operation.

For example, the PLC 315 or 415 may be programmed to calculate feed rates of the fertilizers, nutrients and/or micronutrients for a given day based on an expected 8-hour irrigation schedule. However, for example, a grower, field manager or field technician may actually run the irrigation water pump for 7 hours or 9 hours on the given day. In this event, the PLC 315 or 415 tracks the time interval(s) during which the pump is run or operated, and adjusts the feed rate of the fertilizer, nutrient and micronutrient pumps proportionally for the next scheduled irrigation day. In the example where the irrigation water pump is run for 7 hours, the feed rate of the fertilizer, nutrient and micronutrient pumps is increased to 114-115% ($8/7^{ths}$) of the programmed rate on the next scheduled irrigation day, and the example where the irrigation water pump is run for 9 hours on the given day, the feed rate of the fertilizer, nutrient and micronutrient pumps is decreased to 88-90% ($8/9^{ths}$) of the programmed rate on the next scheduled irrigation day. As a result, on the next irrigation day (or other period of time during which such adjustments and/or corrections are made), the PLC 315 or 415 corrects for variations in the irrigation schedule in order to achieve the target rates over a longer period of time. If further changes occur, the PLC 315 or 415 maintains the desired profile by slowly making the appropriate changes or adjustments. In general, the longer the time period for such changes or adjustments, the greater the likelihood of avoiding any undesired spikes in the fertilizer/nutrient feed rate.

The automated apparatus and system can turn on and off any fertilizer, nutrient or micronutrient in accordance with the predetermined and/or calculated targets and schedule (e.g., the fertigation profile). For example, the automated apparatus keeps the pump for supplying phosphorous-based fertilizers and/or nutrients off until a predetermined starting time in the growing season arrives. The user (e.g., a data analyst or other user of the remote computer) typically makes a change to a target or schedule only when conditions such as weather or crop growth necessitate such a change (e.g., to the fertigation profile). Otherwise, the automated apparatus and system control the addition of the fertilizers, nutrients and/or micronutrients according to the initial (or modified) fertigation profile for the growing season.

A First Exemplary Field Test

A post-harvest fertilizer application using a prototype of the present Automated Continuous Fertigation apparatus similar or identical to the apparatus 300 shown in FIG. 3 to deliver various fertilizers through a conventional irrigation system on a pilot scale was conducted for one month in a test field in the San Joaquin Valley in central California. The predetermined targets were 35 lbs./acre of calcium ammonium nitrate having 17% by weight of nitrogen (as N) and 8-9% by weight of calcium (as Ca), 25 lbs./acre of aqueous phosphoric acid providing 42% by weight of phosphorous (calculated as $P_2O_5$), 40 lbs./acre of aqueous KOH providing 42% by weight of potassium (calculated as $K_2O$), 5.5 lbs./acre of a first micronutrient mixture providing about 0.3% by weight of boron, 0.42% by weight of manganese, about 1.0% by weight of zinc, 0.42% by weight of iron, 0.12% by weight of copper, 0.04% by weight of magnesium, 0.02% by weight of cobalt, 0.02% by weight of molybdenum and about 1.0-1.1% by weight of nitrogen, and 7.2 lbs./acre of a second micronutrient mixture providing about 2% by weight of boron and about 4% by weight of zinc. All metals in the micronutrient mixtures are chelated. Although the combination of these fertilizers, nutrients and/or micronutrients would normally cause interactions that would result in plugging of the irrigation system, this problem is addressed as specified in U.S. Pat. Nos. 8,568,506, 8,628, 598, 8,690,982, 8,690,983, 8,690,984, 8,721,758, 8,721,759, 8,821,646, 8,979,969, 8,986,417, 8,986,418, and 9,148,993, the relevant portions of any one or more of which are incorporated herein by reference. The irrigation schedule for this field was set at 8 hours/day at nominally 950 GPM, Monday, Wednesday, and Friday for the entirety of the month (the month having 31 days). This information was input into the PLC software.

At this point, a series of initial calculations were independently performed by the PLC to determine target pump outputs, tank volume changes, fertilizer tank fill and/or refill requirements, and a monitoring schedule. The calculation results output by the PLC were used by the PLC in the automated system to initialize the settings for the pumps respectively corresponding to tanks containing the calcium ammonium nitrate, the phosphoric acid, the potash, the first micronutrient mixture and the second micronutrient mixture, and to perform subsequent calculations and adjustments for the system. Although the system was continuously monitored, data from the PLC was input into a remote database daily at 7 AM for reporting purposes. Summary reports of this data were automatically generated by a computer operably linked to the remote database and emailed to a data analyst in charge of evaluating the apparatus and to an owner and/or manager of the field. This information was also available at any time (e.g., on demand) via a secure, log on connection to reporting software in the apparatus.

The pressure and flow of the irrigation system was continuously monitored by the PLC to determine when the irrigation system was active and to ensure that fertilizer was applied only during irrigation system activity. The performance of the automated system was reported without interruption, and any unexpected situations were immediately flagged for further review. On the second day of the test (which was also the first irrigation day; the irrigation system was off on the first day of the test), the automated system reported that the pump for the first micronutrient mixture (the "the Micro 1 pump") was not functioning during the beginning of the irrigation period on the first day of the test. This alarm prompted a test supervisor to dispatch a field technician to the site to replace the pump and ensure that the replacement pump was working properly during the next irrigation period (on the second irrigation day, which was the $4^{th}$ day of the test). The system software in the PLC automatically adjusted the pump output to account for the loss of injection time on the first day. On the $16^{th}$ day, the automated reporting system communicated an alarm that the irrigation water was not flowing during a scheduled irrigation period. The owner and/or manager of the field was promptly contacted, and it was determined that the irrigation water pump at the site had malfunctioned. The irrigation water pump was repaired and operational after 3 days, and irrigation resumed on day 20 of the test. The irrigation schedule for the subsequent week was increased to 12 hours/day to make up for the loss of irrigation. The PLC system software was able to automatically account for the 3-day loss of treated irrigation water, as well as the increased length of time scheduled for irrigation, and it automatically adjusted the pumps accordingly to meet the targets.

Other than the site visit prompted by the automated system alarm to replace the Micro 1 pump, no other site visits were required by personnel responsible for the test and the present Automated Continuous Fertigation apparatus. At the end of the month, all fertilizer targets were met, with a deviation ranging from 0.2-1.3% from the target, and an average deviation of 0.6%. In addition, the linearity of the feed rate was exceptional (based on irrigation periods), and the ability of the automated system to monitor and adjust for variabilities in pump output was proven successful. The pH was maintained within the target range of 6.5±0.1 during the entire irrigation period. This conservation of the pH was attained by the PLC software continuously monitoring the pH of the treated irrigation water and adjusting the output of the pump for adding concentrated sulfuric acid to the irrigation water.

Apart from the ability of the apparatus to monitor and adjust for a wide variety of both deliberate and unpredictable changes, malfunctions, and performance issues, the myriad of alarms in the automated apparatus and system ensured that all sensors, hardware, and equipment were functioning properly. For example, the automated apparatus and system was configured to detect leaks from each fertilizer, nutrient and micronutrient tank and corresponding subsystem for supplying the fertilizer, nutrient and/or micronutrient to the irrigation water. Additionally, individual pump performance was monitored, and corresponding alarms could be triggered to indicate that a pump is performing below an acceptable level (as was the case with the Micro 1 pump).

The signal and calibration characteristics of the pH measuring system were recorded to assure proper probe functionality and indicate whether recalibration or replacement was necessary or desired. If so, an alarm could be triggered and can send one or more messages via the reporting system, as well as SMS and email messages to designated personnel. The ability of the automated system to respond to the performance of the equipment and resolve issues with the equipment resulted in a dramatic reduction in human interaction or interference with the site and the equipment at the site. The amount of time required by test personnel to be physically present at the site was reduced by 87%, with a concurrent dramatic improvement in linear feed rates, achievement of targets, and overall site performance. These results are significant, due to the high cost of the labor necessary to operate and maintain the prior non-automated system(s). As a further result, with further improvements and/or optimization, the present apparatus, system and method(s) may be even more valuable in the future. In addition, it is not feasible for a human to attend to the operation of a fertigation system continuously and make adjustments to the fertigation system instantly, whereas the present automated apparatus and system can continuously monitor the fertigation system and make adjustments to feed rates of the pumps providing fertilizers, nutrients, micronutrients, and acid or base as frequently as every 3 seconds. Furthermore, a human is generally not able to identify potential problems or malfunctions as well as or as quickly as the present automated apparatus and system. As a result, higher yields of crops and better usage of fertilizers, nutrients and micronutrients may be realized.

A Second Exemplary Field Test

A post-harvest fertilizer application using a prototype of the Automated Continuous Fertigation apparatus similar or identical to the apparatus 400 shown in FIG. 4 to deliver various fertilizers through a conventional irrigation system on a pilot scale was conducted for one month in a test field in the San Joaquin Valley in central California. The predetermined targets were 50 lbs./acre of nitrogen and 26 lbs./acre of calcium from an aqueous solution of calcium ammonium nitrate (having 17% by weight of nitrogen and 8-9% by weight of calcium), 35 lbs./acre (calculated as $P_2O_5$) of 75% by weight aqueous phosphoric acid, 40 lbs./acre of potassium thiosulfate providing about 25% by weight of potassium (calculated as $K_2O$), and 0.5 lbs./acre of a micronutrient mixture providing about 0.6% by weight of boron, 0.24% by weight of manganese, 0.24% by weight of zinc, 0.2% by weight of iron, 0.12% by weight of copper, 0.04% by weight of magnesium, 0.02% by weight of cobalt, 0.02% by weight of molybdenum and 0.44% by weight of nitrogen. All metals in the micronutrient mixture are chelated. The irrigation schedule for this field was set at 4 hours/day at nominally 1200 GPM, Monday-Friday for the entirety of the month (the month having 31 days). This information was input into the PLC software.

At this point, a series of initial calculations were independently performed by the PLC to determine target pump outputs, tank volume changes, fertilizer tank fill and/or refill requirements, and a monitoring schedule. The calculation results output by the PLC were used by the PLC in the automated system to initialize the settings for the pumps respectively corresponding to tanks containing the calcium ammonium nitrate, the phosphoric acid, the potash, the first micronutrient mixture and the second micronutrient mixture, and to perform subsequent calculations and adjustments for the system. Although the system was continuously monitored, data from the PLC was input into a remote database daily at 7 AM for reporting purposes. Summary reports of this data were automatically generated by a computer operably linked to the remote database and emailed to a data analyst in charge of evaluating the apparatus and to an owner and/or manager of the field. This information was also available at any time (e.g., on demand) via a secure, log on connection to reporting software in the apparatus.

The pressure and flow of the irrigation system was continuously monitored by the PLC to determine when the irrigation system was active and to ensure that fertilizer was applied only during irrigation system activity. The performance of the automated system was reported without interruption, and any unexpected situations were immediately flagged for further review. On the first scheduled irrigation day of the test, the PLC automatically recognized that the micronutrient mixture pump was over-performing by over 200% of the corresponding target(s). While this alarm was immediately communicated to personnel responsible for the test and the automated equipment, the PLC was able to automatically adjust the pump performance and quickly bring the pump output into the target range. As a result, no human interaction with the apparatus and no physical presence on the site were necessary. On the $22^{nd}$ and $23^{rd}$ days of the test, the site received enough water from rain to turn off the main irrigation water pump. Irrigation was not resumed until the $26^{th}$ day of the test. The PLC system software was able to automatically account for the decreased level of fertilizer, nutrient and micronutrient application due to the shutdown of the irrigation water pump, and it automatically adjusted the fertilizer, nutrient and micronutrient pumps accordingly to meet the corresponding targets. The PLC system software was able to automatically account for the decreased level of fertilizer, nutrient and micronutrient application, and it automatically adjusted the pumps accordingly to meet the targets.

No site visits were required by personnel responsible for the test and the present Automated Continuous Fertigation apparatus. At the end of the month, all fertilizer targets were met, with a deviation ranging from 0.02-0.48% from the target, and an average deviation of 0.23%. In addition, the linearity of the feed rate was exceptional (based on irrigation periods), and the ability of the automated system to monitor and adjust for variabilities in pump output was proven successful.

One of the main differences from the exemplary apparatus 300 (FIG. 3) is that the exemplary apparatus 400 (FIG. 4) does not monitor or control pH, and this apparatus is advantageous for certain fertigation strategies and/or systems, based on the types of fertilizers and/or nutrients that are to be fed by the apparatus. In some examples of either apparatus 300 (FIG. 3) or apparatus 400 (FIG. 4), the apparatus includes an optional feature that allows each pump to be timed independently, so that certain pumps will run at only designated times. These optional run times are fully adjustable for any possible pumping schedule. This flexibility allows the system to feed a very large variety of fertilizers, nutrients and micronutrients, making it ideal for growers that intend on using many different types of, and possibly incompatible, fertilizers, nutrients and micronutrients.

Apart from the ability of the apparatus to monitor and adjust for a wide variety of both deliberate and unpredictable changes, malfunctions, and performance issues, the myriad of alarms in the automated apparatus and system ensured that all sensors, hardware, and equipment were functioning properly. For example, the automated apparatus and system was configured to detect leaks from each fertilizer, nutrient and micronutrient tank and corresponding subsystem for supplying the fertilizer, nutrient and/or micronutrient to the irrigation water. Additionally, individual pump performance was monitored, and corresponding alarms could be triggered to indicate that a pump is performing above an acceptable level (as was the case with the micronutrient pump).

The ability of the automated system to respond to the performance of the equipment and resolve issues with the equipment resulted in a dramatic reduction in human interaction or interference with the site and the equipment at the site. The amount of time required by test personnel to be physically present at the site in this test was reduced by 95%, with a concurrent dramatic improvement in linear feed rates, achievement of targets, and overall site performance. These results are significant, due to the high cost of the labor necessary to operate and maintain the prior non-automated system(s). As a further result, with further improvements and/or optimization, the present apparatus, system and method(s) may be even more valuable in the future. In addition, it is not feasible for a human to attend to the operation of a fertigation system continuously and make adjustments to the fertigation system instantly, whereas the present automated apparatus and system can continuously monitor the fertigation system and make adjustments to feed rates of the pumps providing fertilizers, nutrients, micronutrients, and acid or base as frequently as every 3 seconds. Furthermore, a human is generally not able to identify potential problems or malfunctions as well as or as quickly as the present automated apparatus and system. As a result, higher yields of crops and better usage of fertilizers, nutrients and micronutrients may be realized.

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus, comprising:
   a container;
   a plurality of pumps in the container, wherein each of the plurality of pumps is configured to provide a unique fertilizer, nutrient or micronutrient to irrigation water;
   a controller operably connected to each of the plurality of pumps, wherein the controller is configured to (i) receive from a remote computer an irrigation schedule and an instruction to send performance information, (ii) transmit to the remote computer the performance information, and (iii) control settings of each of the plurality of pumps to provide a predetermined amount of each unique fertilizer, nutrient or micronutrient to the irrigation water over a predetermined period of time; and
   an irrigation line into which the plurality of pumps provide the fertilizer(s), nutrient(s) or micronutrient(s) into the irrigation water,
   wherein the container is sealed, locked, or configured to provide a substantially waterproof housing for the plurality of pumps and the controller.

2. The apparatus of claim 1, wherein the container is sealed or locked, and is configured to provide a substantially waterproof housing for the plurality of pumps, the controller, and any other components enclosed within the housing.

3. The apparatus of claim 1, wherein the plurality of pumps are configured to provide a source of nitrogen, a source of phosphorous, and a source of potassium.

4. The apparatus of claim 3, wherein the plurality of pumps comprises a first pump, a second pump and a third pump, the first pump is configured to provide a first fertilizer or nutrient, the second pump is configured to provide a second fertilizer or nutrient different from the first fertilizer or nutrient, and the third pump is configured to provide a third fertilizer or nutrient different from the first and second fertilizers or nutrients.

5. The apparatus of claim 4, wherein:
   the first fertilizer or nutrient comprises at least one of the source of nitrogen, a source of calcium, and a source of carbon;
   the second fertilizer or nutrient comprises the source of phosphorous; and
   the third fertilizer or nutrient comprises the source of potassium.

6. The apparatus of claim 4, wherein the plurality of pumps further comprises a fourth pump configured to provide a source of acid or base.

7. The apparatus of claim 1, wherein the controller is further configured to receive from the remote computer and store (i) targets for each of the predetermined amounts of each unique fertilizer, nutrient or micronutrient and (ii) settings for each of the plurality of pumps corresponding to the predetermined amount of each unique fertilizer, nutrient or micronutrient over the predetermined period of time.

8. The apparatus of claim 7, wherein the controller is further configured to compare actual amounts of each unique fertilizer, nutrient or micronutrient delivered over the predetermined period of time with the targets for each of the predetermined amount of each unique fertilizer, nutrient or micronutrient, and adjust the settings for each of the plurality of pumps to move the actual amounts of each unique fertilizer, nutrient or micronutrient towards the corresponding targets.

9. The apparatus of claim 1, wherein the performance information comprises at least one of a volume of each of the unique fertilizer(s), nutrient(s) or micronutrient(s) consumed, an irrigation time, an irrigation water volume, an irrigation water rate, a speed of each of the plurality of pumps, and a stroke of each of the plurality of pumps.

10. The apparatus of claim 1, further comprising a pH sensor configured to determine a pH of the irrigation water after the predetermined amount of each unique fertilizer, nutrient or micronutrient is provided thereto, wherein the controller is further configured to receive the pH from the pH sensor, and when the determined pH is outside a predetermined or desired pH range, add an acid or a base to bring the pH of the irrigation water within the predetermined or desired pH range.

11. The apparatus of claim 1, further comprising a plurality of level sensors, each configured to determine a level of a corresponding unique fertilizer, nutrient or micronutrient in a corresponding storage tank or vessel, and the controller is configured to receive information from each of the plurality of level sensors.

12. The apparatus of claim 1, further comprising a plurality of drivers, each configured to control an output of a corresponding one of the plurality of pumps.

13. A method of fertilizing and/or irrigating a field, comprising:
   delivering a predetermined amount of each of a plurality of fertilizers, nutrients or micronutrients to irrigation water for the field over a predetermined period of time using a plurality of pumps in a container, wherein each of the plurality of pumps is configured to provide a unique fertilizer, nutrient, micronutrient or combination thereof to the irrigation water in an irrigation line;
   receiving in a controller in the container an irrigation schedule and an instruction to send performance information from a remote computer, wherein the container is sealed, locked, or configured to provide a substantially waterproof housing for the plurality of pumps and the controller; and controlling settings of each of the plurality of pumps using the controller in the container, wherein the settings of each of the plurality of pumps are configured to provide the predetermined amount of the corresponding unique fertilizer, nutrient, micronutrient or combination thereof to the irrigation water over the predetermined period of time; and transmitting to the remote computer the performance information.

14. The apparatus of claim 2, wherein the container further includes a section of the irrigation line.

15. The method of claim 13, wherein a first fertilizer or nutrient is delivered with a first pump of the plurality of pumps, a second fertilizer or nutrient different from the first fertilizer or nutrient is delivered with a second pump of the plurality of pumps, and third fertilizer or nutrient different from the first and second fertilizers or nutrients is delivered with a third pump of the plurality of pumps.

16. The method of claim 13, further comprising delivering a source of acid or base with one of the plurality of pumps.

17. The method of claim 13, further comprising:

receiving from the remote computer and storing (i) targets for each of the predetermined amount of each unique fertilizer, nutrient or micronutrient and (ii) settings for each of the plurality of pumps corresponding to the predetermined amount of each unique fertilizer, nutrient or micronutrient over the predetermined period of time in the controller;

comparing actual amounts of each unique fertilizer, nutrient or micronutrient delivered over the predetermined period of time with the targets for each of the predetermined amount of each unique fertilizer, nutrient or micronutrient; and adjusting the settings for each of the plurality of pumps to move the actual amounts of each unique fertilizer, nutrient or micronutrient towards the corresponding targets using the controller.

18. The method of claim 13, further comprising transmitting the performance information from the remote computer to a customer or other downstream recipient when the performance information contains no errors.

19. A method of making an apparatus for fertilizing and/or irrigating a field, comprising:

placing a plurality of pumps in a container, wherein each of the plurality of pumps is configured to provide a unique fertilizer, nutrient or micronutrient to irrigation water in an irrigation line; and placing or mounting a controller in the container and operably connecting the controller to each of the plurality of pumps, wherein the controller is configured to (i) receive from a remote computer an irrigation schedule and an instruction to send performance information, (ii) transmit to the remote computer the performance information, and (iii) control settings of each of the plurality pumps to provide a predetermined amount of each unique fertilizer, nutrient or micronutrient to the irrigation water over a predetermined period of time, wherein the container is sealed, locked, or configured to provide a substantially waterproof housing for the plurality of pumps and the controller.

20. The method of claim 19, wherein the plurality of pumps are configured to provide a source of nitrogen, a source of phosphorous, and a source of potassium.

21. The method of claim 20, wherein the plurality of pumps comprises a first pump, a second pump and a third pump, the first pump is configured to provide a first fertilizer or nutrient, the second pump is configured to provide a second fertilizer or nutrient different from the first fertilizer or nutrient, and the third pump is configured to provide a third fertilizer or nutrient different from the first and second fertilizers or nutrients.

* * * * *